United States Patent
Matsuda

(10) Patent No.: US 8,330,975 B2
(45) Date of Patent: Dec. 11, 2012

(54) PRINTING SYSTEM, PRINTING APPARATUS AND TRANSMITTING SERVER

(75) Inventor: Makoto Matsuda, Aisai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1283 days.

(21) Appl. No.: 11/318,607

(22) Filed: Dec. 28, 2005

(65) Prior Publication Data

US 2006/0139689 A1    Jun. 29, 2006

(30) Foreign Application Priority Data

Dec. 28, 2004  (JP) ................................. 2004-381921

(51) Int. Cl.
   *G06F 3/12* (2006.01)
(52) U.S. Cl. ..................................................... 358/1.15
(58) Field of Classification Search ................. 358/1.15, 358/1.1, 1.13, 1.12
   See application file for complete search history.

(56) References Cited

U.S. PATENT DOCUMENTS

| | | | |
|---|---|---|---|
| 2001/0052998 A1* | 12/2001 | Kiyosu et al. ................. | 358/1.15 |
| 2004/0032621 A1 | 2/2004 | Suzuki et al. | |
| 2004/0186801 A1* | 9/2004 | Morita ............................ | 705/32 |
| 2004/0190014 A1* | 9/2004 | Ferlitsch ........................ | 358/1.5 |

FOREIGN PATENT DOCUMENTS

| | | |
|---|---|---|
| JP | 2001-195224 | 7/2001 |
| JP | 2002-032671 | 1/2002 |
| JP | 2002-219843 | 8/2002 |
| JP | 2002-288142 | 10/2002 |
| JP | 2004-078593 | 3/2004 |

OTHER PUBLICATIONS

Office Action received in Japanese application No. 2004-381921 mailed Aug. 5, 2008.
"Printer usage page permits periodic biling much like a power meter", Research Disclosure, Mason Publications, vol. 466, Feb. 2003.
Examination report issued Jan. 18, 2011 in related European Patent Application No. 05258088.3-1238.

* cited by examiner

*Primary Examiner* — Benny Q Tieu
*Assistant Examiner* — Jeremiah Bryar
(74) *Attorney, Agent, or Firm* — Banner & Witcoff, Ltd.

(57) ABSTRACT

An information output system is provided with an information output unit that outputs information represented by service data, and a data transmitting server configured to transmit the service data to the information output unit. The data transmitting server is provided with a charging unit configured to perform a charging operation with respect the service data transmitted to the information output unit, the charging operation being performed at least one predetermined stage after a start and before a completion of the output of the information.

5 Claims, 17 Drawing Sheets

| USER ID | PASSWORD | PAYMENT METHOD | SETTLEMENT ATTRIBUTION INFORMATION | UNSETTLED AMOUNT | LOCK INFO. |
|---|---|---|---|---|---|
| user1 | ******** | CREDIT CARD | ################### | ¥x,xxx | TRUE |
| user2 | ******** | PREPAID CARD | ################### | ¥xxx | FALSE |
| user3 | ******** | DEBIT CARD | ################### | ¥xx,xxx | FALSE |
| ... | ... | ... | ... | ... | ... |

FIG. 3

SESSION MANAGEMENT INFORMATION

| SESSION ID | USER ID | FILE NAME | SERVICE PROGRAM NAME | OUTPUT START FLAG |
|---|---|---|---|---|
| SS1 | user1 | f1 | A | 1 |
| SS2 | user2 | f2 | B | 1 |
| SS3 | user3 | f3 | A | 0 |
| ... | ... | ... | ... | ... |

FIG.10

PRINTING SYSTEM, PRINTING APPARATUS AND TRANSMITTING SERVER

INCORPORATION BY REFERENCE

This application claims priority from Japanese Patent Application No. 2004-381921, filed on Dec. 28, 2004, the entire subject matter of which is incorporated herein by reference.

BACKGROUND OF THE INVENTION

1. Technical Field

Aspects of the invention relate to a printing system including a printing device that prints images represented by print data on a recording medium and a transmitting server that transmits print data to the printing device, the printing device and the transmitting server being capable of performing data communication.

2. Description of Related Art

Conventionally, printing systems of the above configuration have been known. Among such systems, ones that bills a user when a printing operation is executed in accordance with the print data provided by the server have been suggested.

An example of such a system is disclosed in Japanese Patent Provisional Publication No. P2001-195224A (hereinafter, referred to as '224 publication). In '224 publication, a system that bills a user upon completion of a printing of an image, using the printing device, represented by the print data. Specifically, according to the '224 publication, there is provided a printing system which is configured to include a server apparatus and a printing apparatus on a network. In this printing system, a client device creates and transmits print data to the server, which transmits the print data to the printing apparatus. The printing apparatus then prints out the image represented by the print data received from the server apparatus. Upon completion of the printing, the printing apparatus transmits information related to a print cost to the server apparatus. The server apparatus measures an actual printing cost based on the information related to the printing cost to obtain a measured printing cost. The printing costs obtained as above are accumulatively added to a printing cost accumulative value, thereby updating the printing cost accumulative value.

According to the system disclosed in '224 publication, billing is effected upon completion of printing. Therefore, if the printing apparatus becomes in a condition where printing cannot be performed before printing of the image represented by the print data, billing is not effected at all.

Because of above configuration, a malicious user may intentionally cause a communication error or a printing error to turn the printing apparatus in a condition where the printing cannot be performed before the entire image is printed. In such a case, although most of the image has been printed, since the printing job has not completed, the user will not be billed. In the printing apparatus, such a condition can occur relatively easily (e.g., when recording medium is not set, when in or toner is run out, and the like). Therefore, even if the printing apparatus is in such a condition, it is difficult to judge whether the condition is caused intentionally or accidentally.

SUMMARY OF THE INVENTION

Aspects of the invention provides an improved printing system, printing apparatus and data transmission server with which the above-described problem can be solved.

BRIEF DESCRIPTION OF THE ACCOMPANYING DRAWINGS

FIG. 3 illustrates charge information stored in a charge information storage unit of the function server according to aspects of the invention.

FIG. 10 illustrates configuration of session management information stored in a session management storage unit of the function server according to aspects of the first embodiment of the invention.

DETAILED DESCRIPTION

General Overview

Figure 1:
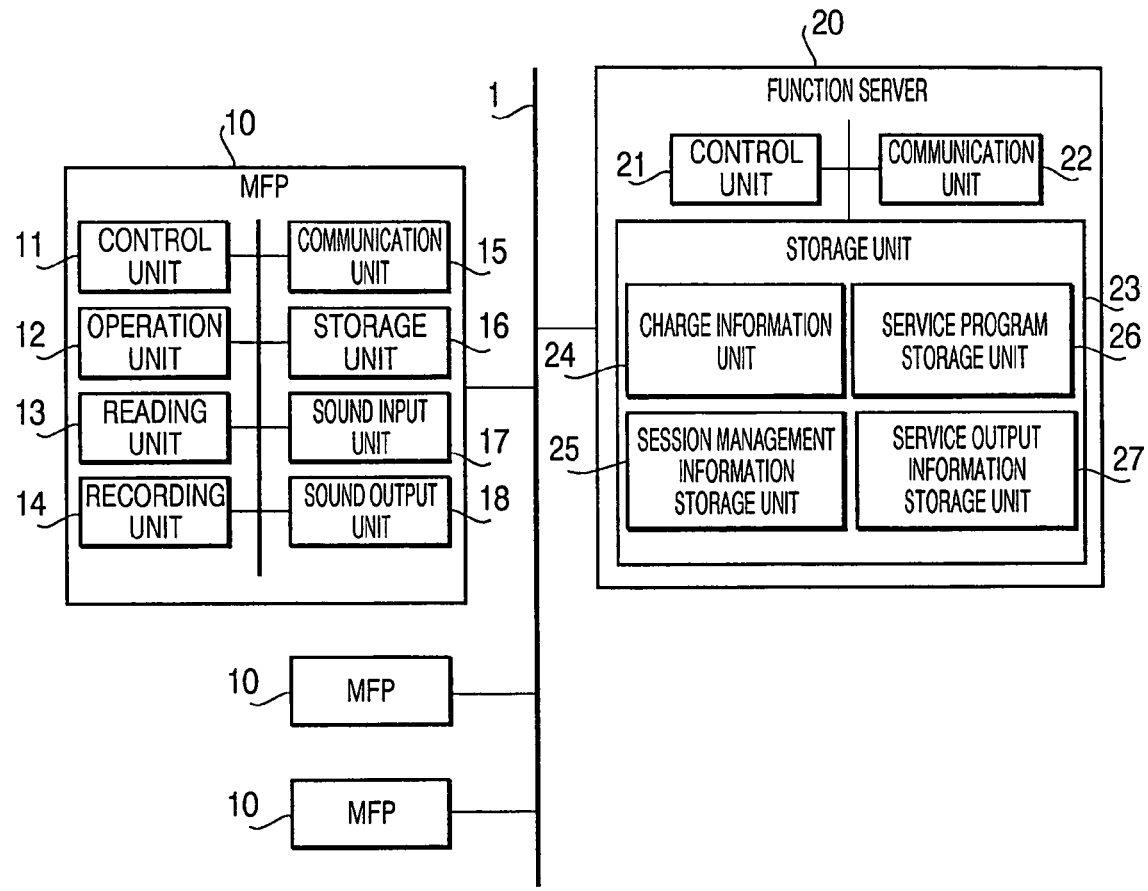
FIG. 1 is a block diagram illustrating a configuration of a printing system according to aspects of the invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

According to aspects of the invention, there is provided a printing system, which includes a printing apparatus configured to print an image represented by print data on a recording medium, and a data transmitting server configured to transmit the print data to the printing apparatus, the data transmitting server being capable of performing data communication with the printing apparatus. The printing apparatus is provided with a printing unit configured to receive the print data transmitted by the data transmitting server and print an image represented by the received print data on the recording medium, and the data transmitting server is provided with a charging unit configured to perform a charging operation with respect the print data transmitted to the printing apparatus, the charging operation being performed when a progress of the printing unit after a start of a printing operation and before a completion of the printing operation reaches a predetermined charging stage.

The predetermined charging stage may be a stage when the printing operation is started.

The predetermined charging stage may be a stage within a term defined prior to the completion of the printing operation.

The printing apparatus may include a print progress notifying unit that transmits progress data indicative of the progress of the printing operation to the data transmission server, and the charging unit may recognize the progress of the printing operation in accordance with the progress data.

The progress notifying unit may transmit the progress data to the data transmission server when the printing operation has reached the predetermined charging stage, and the charging unit may perform the charging operation when the progress data is received from the printing unit.

The print progress notifying unit may transmit the progress data to the data transmission server together with identification information with which the print data corresponding to the progress data can be identified.

The data transmission server may include a charging status storage that stores the identification information in association with a charging status for the corresponding print data, and the charging unit may be configured such that the charging operation one executed will not be re-executed based on the charging status stored in the charging status storage.

According to further aspects of the invention, there is provided a printing system, which is provided with a printing apparatus configured to print an image represented by print data on a recording medium, and a data transmitting server configured to transmit the print data to the printing apparatus, the data transmitting server being capable of performing data communication with the printing apparatus. The printing apparatus is provided with a printing unit configured to receive the print data transmitted by the data transmitting server and print an image represented by the received print data on the recording medium, and a progress notifying unit configured to transmit progress data indicative of progress of a printing operation executed by the printing unit to the data transmission server. Further, the data transmitting server is provided with a charging unit configured to determine the progress of the printing operation based on the progress data received from the printing unit and perform charging operations with respect the print data transmitted to the printing apparatus at a plurality of different stages in accordance with the progress of the printing operation.

The progress notifying unit may transmit the progress data at each of the plurality of different stages between the start and the completion of the printing operation by the printing unit, and the charging unit may execute the charging operation upon every reception of the progress data.

The print progress notifying unit may transmit the progress data to the data transmission server together with identification information with which the print data corresponding to the progress data can be identified.

The data transmission server may include a charging status storage that stores the identification information in association with a charging status for the corresponding print data, and the charging unit may be configured such that the charging operation one executed will not be re-executed based on the charging status stored in the charging status storage.

According to aspects, there is provided an information output system, which is provided with an information output unit that outputs information represented by service data, and a data transmitting server configured to transmit the service data to the information output unit. The data transmitting server is provided with a charging unit configured to perform a charging operation with respect the service data transmitted to the information output unit, the charging operation being performed at least one predetermined stage after a start and before a completion of the output of the information.

The at least one predetermined stage may include only one predetermined stage. Alternatively, the at least one predetermined stage includes a plurality of predetermined stages each defined between the start and completion of the output of the information.

The information output unit may include an output progress notifying unit that transmits progress data indicating a progress of the output of the information to the data transmitting server.

According to aspects of the invention, there is provided a printing apparatus, which is configured to print an image represented by print data on a recording medium, for a printing system provided with the printing apparatus, and a data transmitting server configured to transmit the print data to the printing apparatus, the data transmitting server being capable of performing data communication with the printing apparatus, the data transmitting server being provided with a charging unit configured to perform a charging operation with respect the print data transmitted to the printing apparatus, the charging operation being performed when a progress of the printing unit after a start of a printing operation and before a completion of the printing operation reaches a predetermined charging stage. The printing apparatus is provided with a progress notifying unit configured to transmit progress data indicative of progress of a printing operation executed by the printing unit to the data transmission server.

According to aspects of the invention, there is provided with a printing apparatus, which is configured to print an image represented by print data on a recording medium, for a printing system provided with the printing apparatus, and a data transmitting server configured to transmit the print data to the printing apparatus, the data transmitting server being capable of performing data communication with the printing apparatus, the data transmitting server being provided with a charging unit configured to determine the progress of the printing operation based on the progress data received from the printing unit and perform charging operations with respect the print data transmitted to the printing apparatus at a plurality of different stages in accordance with the progress of the printing operation. The printing apparatus is provided with a progress notifying unit configured to transmit progress data indicative of progress of a printing operation executed by the printing unit to the data transmission server.

According to further aspects of the invention, there is provide a data transmission server configured to transmit print data to a printing apparatus. The data transmitting server may be provided with a charging unit configured to perform a charging operation with respect the print data transmitted to the printing apparatus, the charging operation being performed when a progress of the printing apparatus after a start of a printing operation and before a completion of the printing operation reaches a predetermined charging stage.

The charging unit may recognize the progress of the printing operation in accordance with the progress data.

According to aspects of the invention, there is provided a data transmission server configured to transmit print data to a printing apparatus. The data transmitting server is provided with a charging unit configured to determine the progress of the printing operation based on the progress data received from the printing unit and perform charging operations with respect the print data transmitted to the printing apparatus at a plurality of different stages in accordance with the progress of the printing operation.

Embodiments

Hereinafter, referring to the accompanying drawings, embodiments of the invention will be described in detail.

First Embodiment

FIG. 1 is a block diagram showing a configuration of a printing system according to a first embodiment.

The printing system shown in FIG. 1 includes a plurality of MFPs (Multi-Function Peripherals) 10, 10, ... and a function server. The MPFs 10 and the function server 20 are connected through a network 1 so that data communication can be performed therebetween. According to the first embodiment, the network 1 is the Internet.

Each MFP 10 has functions of a telephone (voice communication), a scanner, a printer, a copier and a facsimile machine. As show in FIG. 1, the MFP 10 includes a control unit 11, an operation unit 12, a reading unit 13, a recording unit 14, a communication unit 15, a sound input unit 17 and a sound output unit 18.

The control unit 11 is configured to have a well-known microcomputer including a CPU (Central Processing Unit), a ROM (Read Only Memory), a RAM (Random Access Memory) and the like. The control unit 11 controls each unit of the MFP 10.

Figure 2:
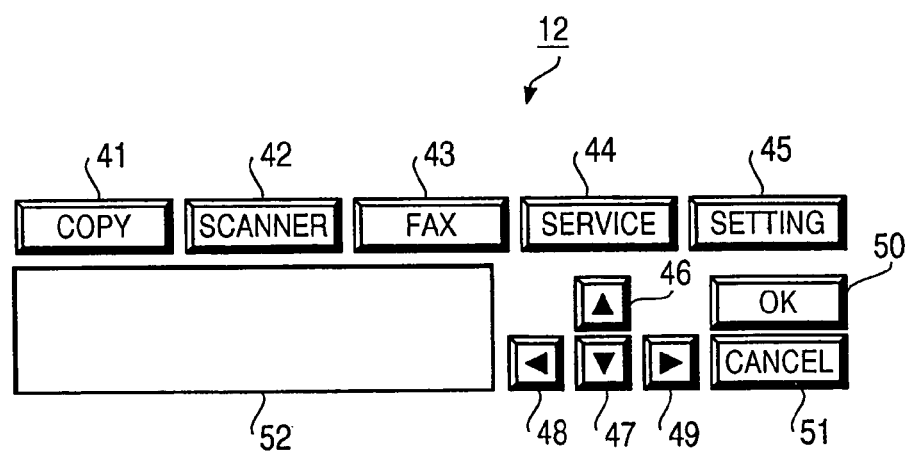
FIG. 2 illustrates an operation panel provided to an MFP (Multi-Function Peripheral) according to aspects of the invention.

The operation unit 12 is provided with an operation panel 12a (see FIG. 2) arranged on an outer surface of the MFP 10. The operation unit 12 accepts user's input, and displays various pieces of information to the user. Specifically, the operation panel 12a includes, as input unit (key group), a copy key 41, a scanner key 42, a FAX key 43, a service key 44, a set key 45, up/down/left/right keys 46, 47, 48 and 49, an OK key 50 and a cancel key 51. Further, as a display unit for displaying information to be viewed by the user, a display 52 is provided. The operation unit 12 transmits input operation performed using the operation 12a to the control unit 11. Further, in accordance with commands from the control unit 11, various pieces of information (e.g., messages) for the user are displayed on the display 52.

The reading unit 13 operates, in accordance with the command from the control unit 11, to read image on an original set at a predetermined original scanning position, and reads (scans) the image formed on the original using an image sensor such as a CCD (Charge Coupled Device) or CIS (Contac Image Sensor) to generate image data.

The recording unit (printer) 14 operates, in accordance with the command from the control unit 11, to feed recording sheets accommodated in a sheet cassette one by one, form an image represented by the image data (print data) on the recording sheet in accordance with an image formation method such as a laser transfer method (electrophotographic imaging method), inkjet method and the like), and then, discharge the sheet to a discharged sheet tray. It should be noted that, the recording unit 14 is capable of printing images based on image data such as one generated by the reading unit 13, facsimile data received with the facsimile function, image data received form a personal computer (not shown) or other external devices such as the function server 20.

The communication unit 14 operates to transmit/receive data via the network 1.

The storage unit 16 stores various pieces of data in a non-volatile RAM (not shown).

The sound input unit 17 operates to acquire sound (voice) through a handset (not shown) provided to the MFP 10, and generate sound data (e.g., PCM data) representing the input sound.

The sound output unit 18 outputs sound represented by sound data from a speaker provided to the handset and/or a speaker (not shown) provided to the MFP 10.

Next, the function server 20 will be described in detail. The function server 20 is for receiving a request for a service from the MFP 10, and provides, in response to the request, the requested service to the MFP 10 that issued the request. The function server includes a control unit 21, a communication unit 22 and a storage unit 23.

The control unit 21 is configured to have a well-known microcomputer including a CPU, a ROM and a RAM. The control unit 21 controls the entire operation of the function server 20 (i.e., various components thereof).

The communication unit 22 operates to transmit/receive data through the network 1.

The storage unit 23 operates to store various pieces of data on a hard disk (not shown). Specifically, the storage unit 23 is provided with a charge information storage unit 24 configured to store charge information described later (see FIG. 3), a session management information storage unit 25 configured to store session management information described later (see FIG. 10), a service program storage unit 26 configured to store service programs described later, and a service output information storage unit 27 configured to store output data described later.

The service programs stored in the service program storage 25 are executed to provide various services to the MFP 10. That is, the service program storage 26 stores a plurality of service programs corresponding to a plurality of services which can be provided to the MFP 10. When each of the service programs is executed, a corresponding service is provided to the MFP 10. Specifically, for example, the services include a translation copy service which is a service for translating a text read from an original with the reading unit 13 of the MFP 10 into a predetermined language (e.g., English), generates print data containing the translated text, and controls the recording unit 14 of the MFP 10 to print the thus generated print data, a news providing service which is a service for obtaining the latest news data from a predetermined data base, generating print data representing the thus obtained news data, and let the recording unit 14 of the MFP 10 print out the print data, and a reading aloud service that is a service for converting a text read from an original with the reading unit 13 of the MFP 10, converting the text to sound (voice) data, and controls the sound output unit 18 of the MFP 10 to output the sound data.

Next, operations performed by the printing system according the embodiment will be described in detail.

When a user depresses the service key 44 of the operation panel 12a, the MFP 10 displays a service selection window (not shown) allowing the user to select a desired service from a plurality of services the function server 20 can provided (i.e., available to the MFP 10) on the display 52 of the operation panel 12*a*. It should be noted that the services the function server 20 may provide may be stored in the MFP 10 in advance. Alternatively, data representing the services that can be provided by the function server 20 may be transmitted from an external device (e.g., the function server 20 or any other server) to the MFP 10, then even in an environment where the available services may change), the user can select a desired service from the latest list of the services.

When the user selects one of the services from the plurality of available services displayed on the display 52 of the MFP 10, the MFP 10 displays an ID input window (not shown) allowing the user to input the user ID and a password on the display 52 of the operation panel 12*a*.

The user ID and the password are identification information intrinsic to each user, which is necessary to receive the services provided by the function server 20. The identification information is assigned to each user when the user performs a predetermined registration procedure with respect to a service provider using the function server 20. In the printing system according to the embodiment, the function server 20 is configured to execute a charging procedure for charging each user who requests the services, and the user ID and password are used by the function server 20 to identify the user who has requested each service. It should be noted that the user registration service may be executed through the operation panel 12*a* of the MFP 10, personal computers or the like.

In the user registration procedure, the user is required to register a method of payment (credit card, prepaid card, debit card or the like) and/or corresponding information (i.e., the card number, the password of the card, and the like, which are necessary of payment). Such information is stored in the charge information storage 24 of the function server 20 as the charge information. Specifically, as shown in FIG. 3, in the charge information storage 24, the user ID, password, the payment method, the information corresponding to the payment method, unsettled charging amount, and lock information are stored. The unsettled amount represents the accumulated amount of charges which has not yet settled by the user or the direct debit has not yet been performed. The lock information represents whether the charge information is rewritable. That is, when the lock information represents "FALSE", the charge information is rewritable, while the charge information cannot be rewritten when the lock information represents "TRUE". When the charge information is being rewritten, the lock information is set to "TRUE". That is, the lock information prevents a plurality of rewriting operations of the charge information from being executed simultaneously.

When the user inputs the user ID and the password through the ID input window displayed on the display 52, the MFP 10 requests the function server 20 for the service selected by the user through the service selection window.

When the service request is received from the MFP 10, the function server 20 executes the service program corresponding to the requested service, and transmits data (such as print data, sound data etc., which will be occasionally referred to as "output data" hereinafter) corresponding to the service contents to the MFP 10 which has issued the service request. When the MFP 10 starts executing a process to output the "output data" corresponding to the requested service (e.g., printing out an image corresponding to the data, output sound represented by the data, etc.), the function server 20 executes the charging procedure for the service. That is, the function server 20 updates the unsettled charging amount of the charge information stored in the charge information storing unit 24 corresponding to the requested service.

Figure 4:
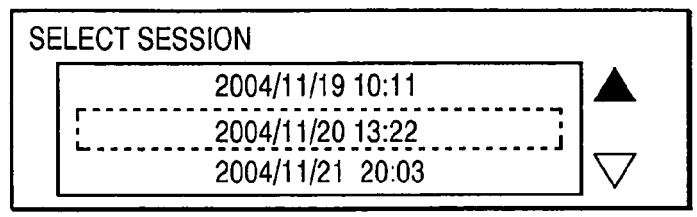
FIG. 4 illustrates a window for designating retransmission data.

In the printing system according to the embodiment, the MFP 10 is capable of requesting the function server 20 for re-transmission of the output data. That is, the function server 20 is configured such that the output data to be transmitted to the MFP 10 is stored in the service output information storage unit 27 of the storage unit 23, and that the output data is transmitted to the MFP 10 upon request for retransmission. On the other hand, the MFP 10 displays a retransmission data selection window (see FIG. 4) allowing the user to select the output data to be retransmitted on the display 52 of the operation unit 12*a*, when the user performs a predetermined retransmission operation on the operation panel 12*a*. Specifically, every time when a service request is transmitted to the function server 20, the MFP 10 stores information for identifying the service request (i.e., date/time information indicative of date and time when the session ID and the service are requested) in the storage unit 16 (which is shown as S110 in FIG. 5), and in the retransmission data selection window, the data/time information stored in the storage unit 16 is displayed as a list. When the user selects on of the pieces of the data/time information displayed in the retransmission data selection window, the MFP 10 displays the ID input window similarly to a case when the service is firstly requested on the display 52 of the operation panel 12*a*. When the user inputs the user ID and the password, the MFP 10 executes a process for requesting the function server for retransmission of the output data corresponding to the date and time selected by the user on the retransmission data selection window.

In the printing system, the output data stored in the service output data information storage unit 27 of the function server 20 is deleted as a predetermined input operation at the MFP 10. When the user operates through the operation panel 12*a* a predetermined deleting operation, the MFP 10 displays a delete data selection window (not shown) on the display 52 of the operation panel 12*a* for allowing the user to select the output data to be deleted (i.e., of which the deletion request is transmitted to the function server 20). Specifically, similar to the retransmission data selection window shown in FIG. 4, as data for identifying the output data to be transmitted, the date/time information stored in the storage unit 16 is displayed as a list. When the user selects date/time information in the delete data selection window (a window similar to one shown in FIG. 4) displayed on the display 52, the MFP 10 displays the ID input window similarly to a case where the service is requested on the display 52 of the operation unit 12*a*. When the user inputs the user ID and the password in the ID input window, the MFP 10 executes a process of transmitting a request for deletion of the output data corresponding to the user-selected date and time in the deletion data selecting window to the functions server 20.

Next, procedures respectively executed by the control unit 11 of the MFP 10 and the control unit 21 of the function server 20 will be described in detail.

Figure 5:
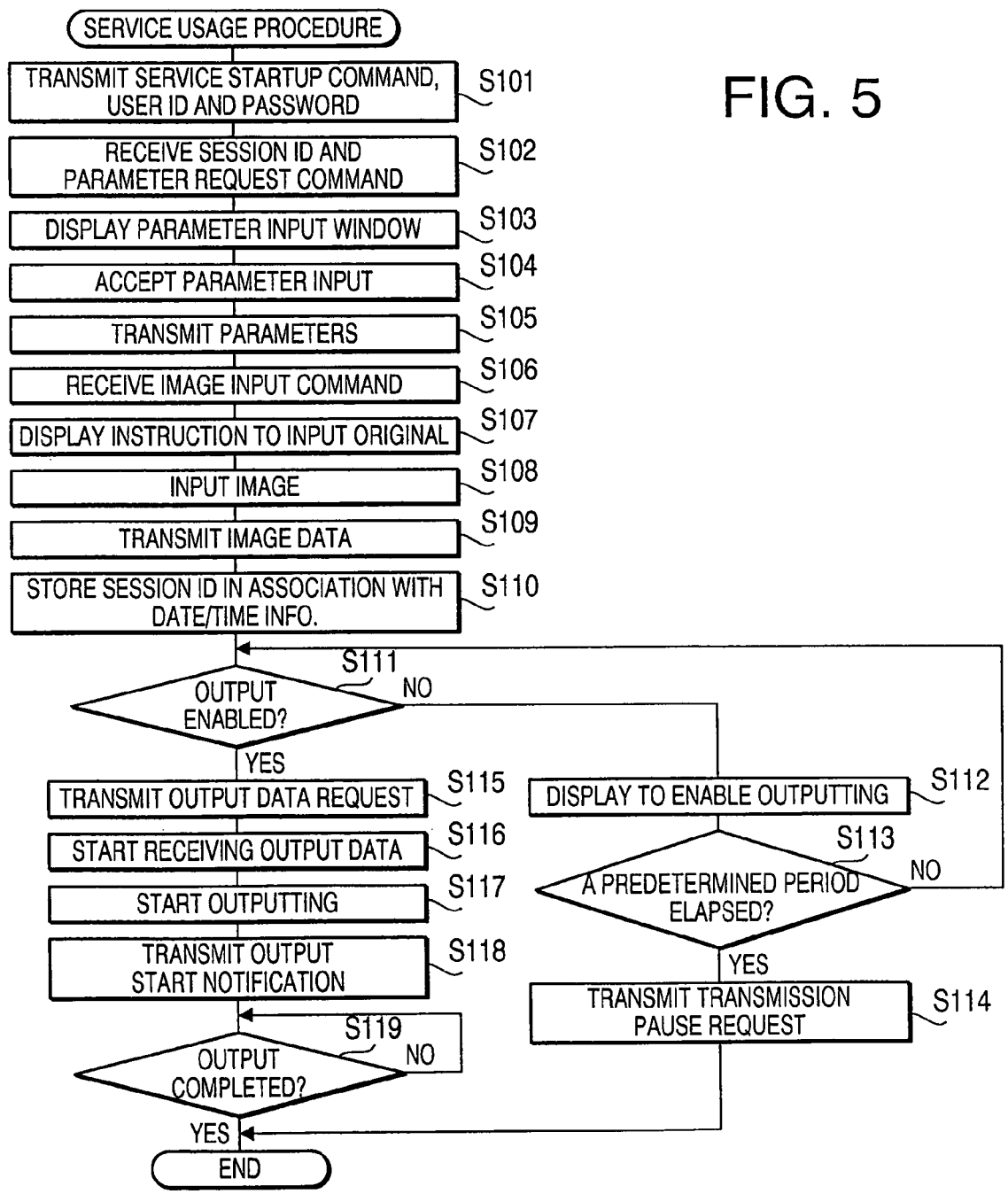
FIG. 5 is a flowchart illustrating a service usage process according to a first embodiment.

FIG. 5 shows a flowchart illustrating a service usage procedure executed by the control unit 11 of the MFP 10. The service usage procedure is started when a service is selected through the service selection window displayed on the display 52 of the operation panel 12*a* and the user ID and the password are input through the ID input window. It should be noted that concrete contents of the service usage process may be different depending on the requested service. For example, depending on a service, an image of the original should be read with the reading unit 13, which may not be necessary for another service. In the following description, as an example, it is assumed that the translation copy service is selected.

When the service usage procedure is started, in S101, a service start-up command corresponding to the service selected through the service selection window (i.e., the translation copy service in this example) that requests the function server 20 for the selected service, and the user ID and password of the user who made the request are transmitted to the function server 20.

In S102, the control receives the session ID and parameter request command which are transmitted from the function server 20 in response to the service start-up command transmitted in S101. Here, the session ID represents identification information intrinsic to each service request, which is used for distinguishing communications related to a plurality of service requests on the function server 20. That is, in the following steps (e.g., S105, S109, S114, S115 and S118), the MFP 10 transmits data to be transmitted to the function server 20 to the function server 20 together with the session ID. The function server 20 is capable of identifying the request data to which the data corresponds based on the session ID. It should be noted that, in this example, the session ID is created in S401 of the translation copy service procedure (FIG. 9) executed by the control unit 21 of the function server 20, and transmitted to the MFP 10 that issued the service start-up command together with the parameter request command in S402.

Figure 6:
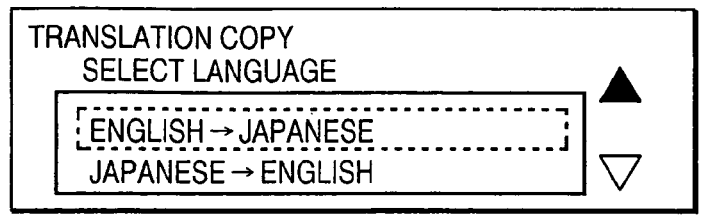
FIG. 6 shows a window for inputting parameters according to aspects of the invention.

In S103, the control displays the parameter input window allowing the user to set parameters necessary of the service (i.e., the translation copy service, in this embodiment) on the display 52 based on the parameter request command received in S102. Specifically, the parameter request command includes XML (eXtensible Markup Language) data representing the parameter input window shown in FIG. 6. The MFP 10 displays the parameter input window on the display 52 in accordance with the XML data. In this example, as destination languages of the translation copy service, a plurality of selectable parameters (e.g., English→Japanese, Japanese→English) are displayed. By operating the up and down keys 46 ad 47 to move a cursor, which is indicated as a rectangle indicated by broken line in up and down directions in FIG. 6 to highlight a desired parameter. Then, by depressing the OK key, the highlighted parameter can be selected (input). Of course, for another service, different parameters necessary for the service are to be set in a similar manner (e.g., for a news providing service, the parameters being category and source of the news). For a service which does not require the parameter setting, the parameter request command is not received in S102, and thus steps S103-S105 are skipped for such a service.

In S104, the control pauses until the user selects a parameter in the parameter input window displayed on display 52. When the user selects the parameter, the control proceeds to S105.

In S105, the control executes a process to transmit the parameter (e.g., "English→Japanese" or "Japanese→English") to the function server 20.

Next, in S106, the control receives the image input command that is transmitted form the function server 20 in response to the parameter transmission executed in S104. The image input command is for requesting the MFP 10 to transmit image data (in this example, the image data of the original of which the text is translated) necessary for providing the service. It should be noted that he image input command is transmitted to the MFP 10 in S404 of the translation copy service (FIG. 9) which is executed by the control unit 21 of the function server 20.

In S107, the control displays a message that asks the user to set the original and have the reading unit 13 read the original bearing the test to be translated (e.g., "[p]lease set the original and touch the OK key") on the display 52 of the operation panel 12a.

In S108, the control pauses until the user operates to read the original. When the reading operation is executed, the control proceeds to S109.

In S109, the control transmits the image data, which is generated by reading the original (i.e., the image data generated by the reading unit 13) is transmitted to the function server 20. If a service which does not require reading of the original (e.g., the news providing service), steps S106 through S109 are skipped.

In S110, the control stores the session ID received in S102 in the storage unit 16 in association with the current date and time. That is, the date/time information when the service is required and the session ID are stored in the storage unit 16 as service request history information. It should be noted that the data stored in S110 is referred to when retransmission of the output data is required, or the output data is requested to be deleted.

In S111, the control judges whether the output data transmitted from the function server 20 can be output (in this embodiment, whether the recording unit 14 can print out the image represent by the print data). It should be noted that, when the recoding sheet is not accommodated in the sheet feed cassette (sheet feed tray) or the recording unit 14 runs short of the toner or the ink of printing the image on the recording sheet, the control judges that the output data cannot be output.

If the control determine that the output data cannot be output (S111: NO), control proceeds to S112, and displays a message asking the user to take necessary steps for changing the condition so that the output data can be output (e.g., a message of "[s]et the recording sheet", or "[f]ill the toner") on the display 52 of the operation unit 12a.

In S113, the control judges whether a predetermined period has elapsed since the control first determined that the output data cannot output in S111, that is, whether a condition where the output data cannot be output has been kept for the predetermined period. It should be noted that the "predetermined period" is a duration of time based on which the control determines whether the operation of the user is executed or not.

If the control determines that the predetermined period has not elapsed (S113: NO), the process returns to S111. If the control determines that the predetermined period has elapsed (S113: YES), the control proceeds to S114. In S114, the control transmits a transmission standby request for requesting to pause (or stop) transmitting the output data to the function server 20. After S114, the control stops the service usage procedure.

In S111, if the control determines that the output data can be output (S111: YES), the process proceeds to S115, and transmits an output data request which requests to transmit the output data, to the function server 20.

In S116, the control starts receiving the output data (the print data after translation, in this example) which is transmitted from the function server 20 in response to the output data request transmitted in S115. Then, in S117, the control starts outputting (i.e., printing operation of the image represented by the received print data, in this example) the "output data" received from the function server 20. It should be noted that the output of the output data is performed in parallel with reception of the same.

In S118, the control transmits an output start notification which notifies of start of the outputting of the output data to the function server 20. In response to this transmission of the notification, the function server 20 starts the charging procedure (charge updating procedure).

In S119, the control judges whether outputting of the output data has been completed (i.e., whether all the print data has been printed). When the control determines that the outputting operation has been completed, the control finishes the service usage procedure.

Figure 7:
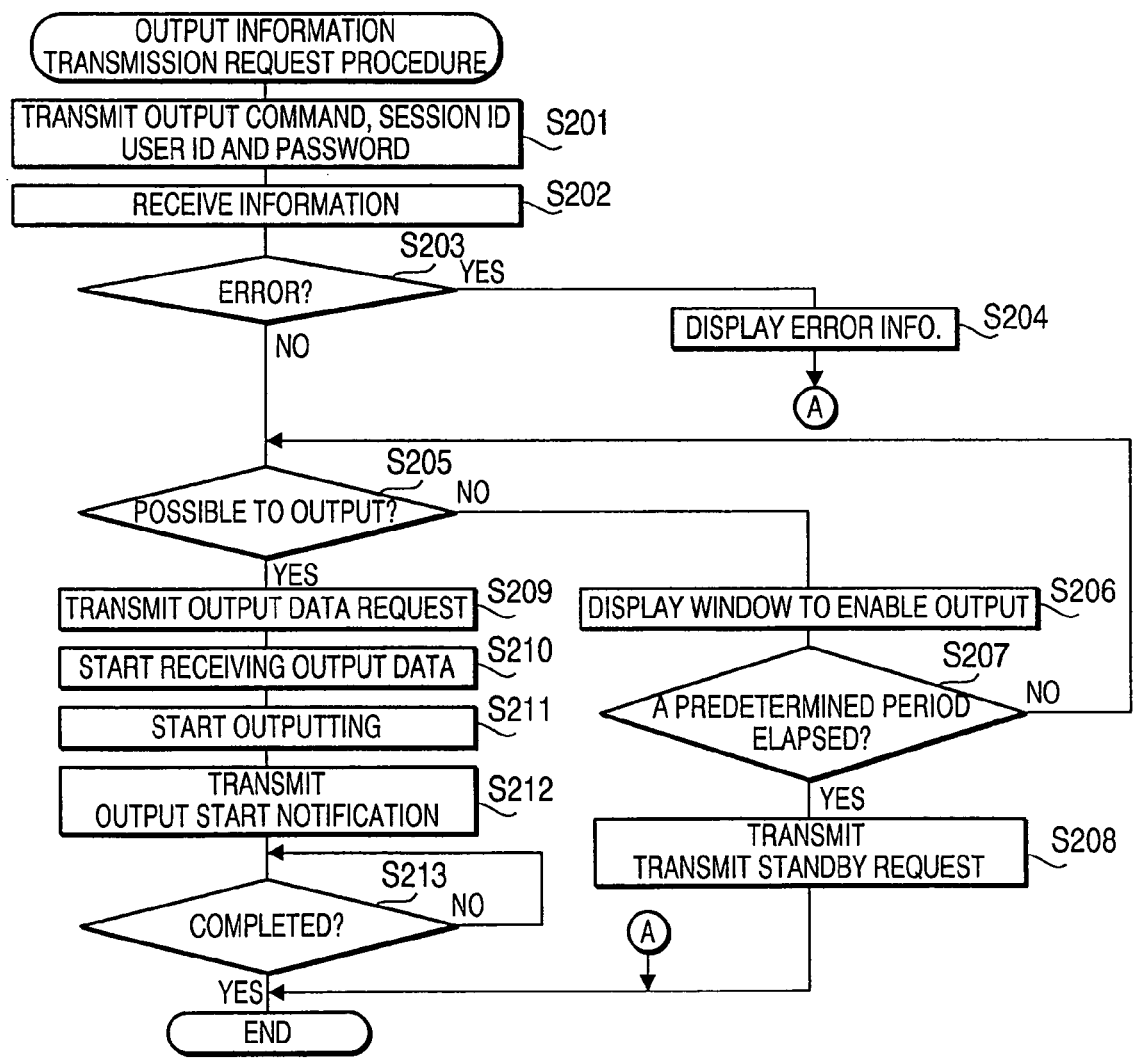
FIG. 7 is a flowchart illustrating an output information transmission request procedure according to aspects of the first embodiment.

Next, an output information transmission requesting procedure executed by the control unit 11 of the MFP 10 will be described with reference to FIG. 7. It should be noted that the output information transmission requesting procedure is started when the user selects the date/time information through the retransmission data selection window (FIG. 4) displayed on the display 52 of the operation panel 12*a*, and further the user inputs the user ID and password through the ID input window.

When the output information transmission requesting procedure is started, in S201, the control transmits an output command requesting the function server 20 to transmit the output data, the session ID corresponding to the date/time information selected through the retransmission data selection window (i.e., the session ID stored in the storage unit 16 corresponding to the selected date/time information), the user ID and password input through the ID input window. It should be noted that, in some steps executed later (i.e., in S208, S209 and S212), the MFP 10 transmits data to be transmitted to the function server 20 together with the session ID. Then, the function server 20 identifies to which service the data is related to in accordance with the received session ID.

In S202, the control receives the information transmitted from the function server 20 in response to the output command transmitted in S201. The information received in S202 is the information indicating whether the function server 20 can transmits the output data. For example, if the transmitted password is wrong, or the output data corresponding to the transmitted session ID is not stored in the service output information storage unit 27, the information indicative of an error status is transmitted. It should be noted that the information is transmitted to the MFP 10 that issued the output command in S502 or S503 of an output information transmitting procedure (FIG. 11) which is executed by the control unit 21 of the function server 20.

Next, in S203, the control judges whether the information received in S202 indicates the error status. If the received information is indicative of the error status (S203: YES), the control proceeds to S204, and an error message is displayed on the display 52 of the operation panel 12*a*. Thereafter, the control finishes the output information transmission requesting procedure.

If the control determines that the received information is not indicates the error status (i.e., the output data can be transmitted), the control proceeds to S205, and judges whether the output data transmitted from the function server 20 can be output (e.g., in the case of the translation copy, whether the recording unit 14 can print the image represented by the print data).

If the control determines that the output data cannot be output (S205: NO), the control proceeds to S206, where a message asking the user to perform an operation to enable the output data to be output (e.g., "[s]et the recording sheet" or "[f]ill the toner") on the display 52 of the operation panel 12*a*.

In S207, the control judges whether a predetermined period has elapsed since it was firstly determined that the output data could not be output in S205 (i.e., whether a status where the output data cannot be output has been kept for the predetermined period).

If the control determines that the predetermined period has not elapsed (S207: NO), the control returns to S205. If the control determines that the predetermined period has elapsed (S207: YES), the control proceeds to S208. In S208, the control transmits the transmission standby request that requests the function server to pause (or stop) transmitting the output data to the function server 20. Thereafter, the control finishes the output information transmission requesting procedure.

If the control determines that the output data can be output (S205: YES), the control proceeds to S209, and transmits the output data request that requests the function server 20 to transmit the output data to the function server 20.

In S210, the control starts receiving the output data (e.g., the print data or the sound data) transmitted from the function server 20 in response to the output data request transmitted in S209. In S211, the control starts outputting the output data received from the function server 20 (e.g., starts printing images represented by the print data, or outputting sound represented by the sound data). It should be noted that the output of the output data is executed in parallel with reception of the same.

In S212, the control transmits the output start notification which notifies of the start of the output of the output data to the function server 20. Next, in S213, the control judges whether the output of the output data has been completed. If the control determines that the output data has been output, it finishes the output information transmission requesting procedure.

Figure 8:
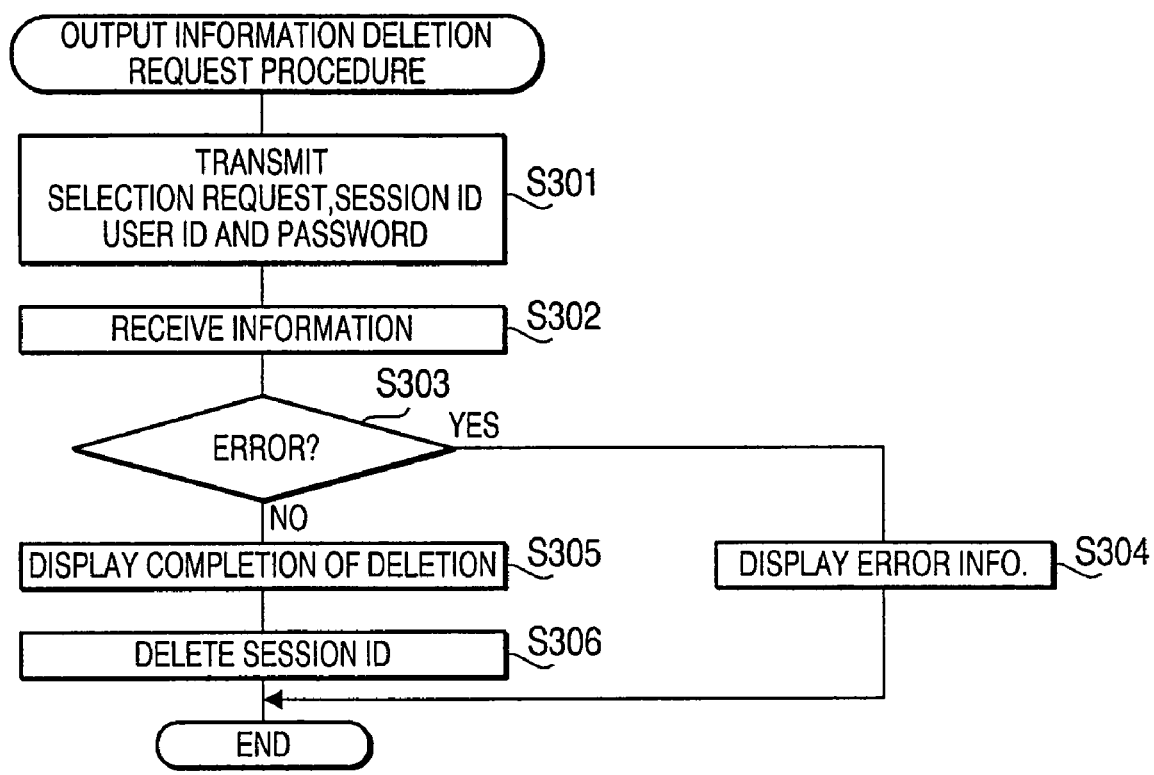
FIG. 8 is a flowchart illustrating an output information deletion request according to aspects of the first embodiment of the invention.

Next, referring to FIG. 8, an output information deletion requesting procedure executed by the control unit 11 of the MFP 10 will be described. The output information deletion requesting procedure is started when the user selects the date/time information through the deletion data selection window (which appears similar to the window shown in FIG. 4) displayed on the display 52 of the operation unit 12*a* and further the user ID and password are input through the ID input window.

Figure 12:
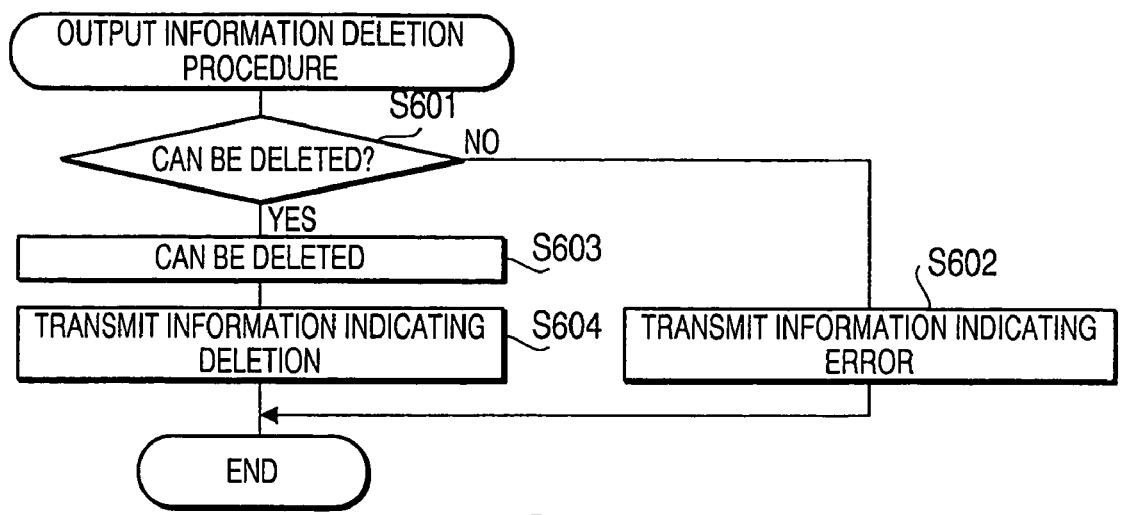
FIG. 12 is a flowchart illustrating an output information deletion procedure according to aspects of the invention.

In S302, the control receives the information transmitted from the function server 20 in response to the transmission of the deletion command in S301. The information received in S302 is indicative of whether the function server 20 is capable of deleting the output data. For example, if the transmitted password was wrong or the output data corresponding to the transmitted session ID was not stored in the service output information storage unit 27, information indicative of an error status is transmitted. It should be noted that the information is transmitted to the MFP 10 that issued the deletion command in S602 or S603 of the output information deleting procedure (FIG. 12) which is executed by the control unit 21 of the function server 20.

Next, in S303, the control judges whether the information received in S302 indicates the error status.

If the control determines that the information received in S302 indicates the error status (S303: YES), the control proceeds to S304 and displays an error message on the display 52 of the operation panel 12*a*. Thereafter, the control finishes the output information deletion requesting procedure.

If the control determines that the received information does not indicate the error status (but indicates that the output data was deleted), the control proceeds to S305, and displays a message indicating completion of the deletion of the output data on the display 52 of the operation panel 12*a*.

In S306, the control deletes the session ID and the date/time information corresponding to the deleted output data from among the session IDs and pieces of date/time information stored in the storage unit 16. Then, the control finishes the output information deletion requesting procedure.

Figure 9:
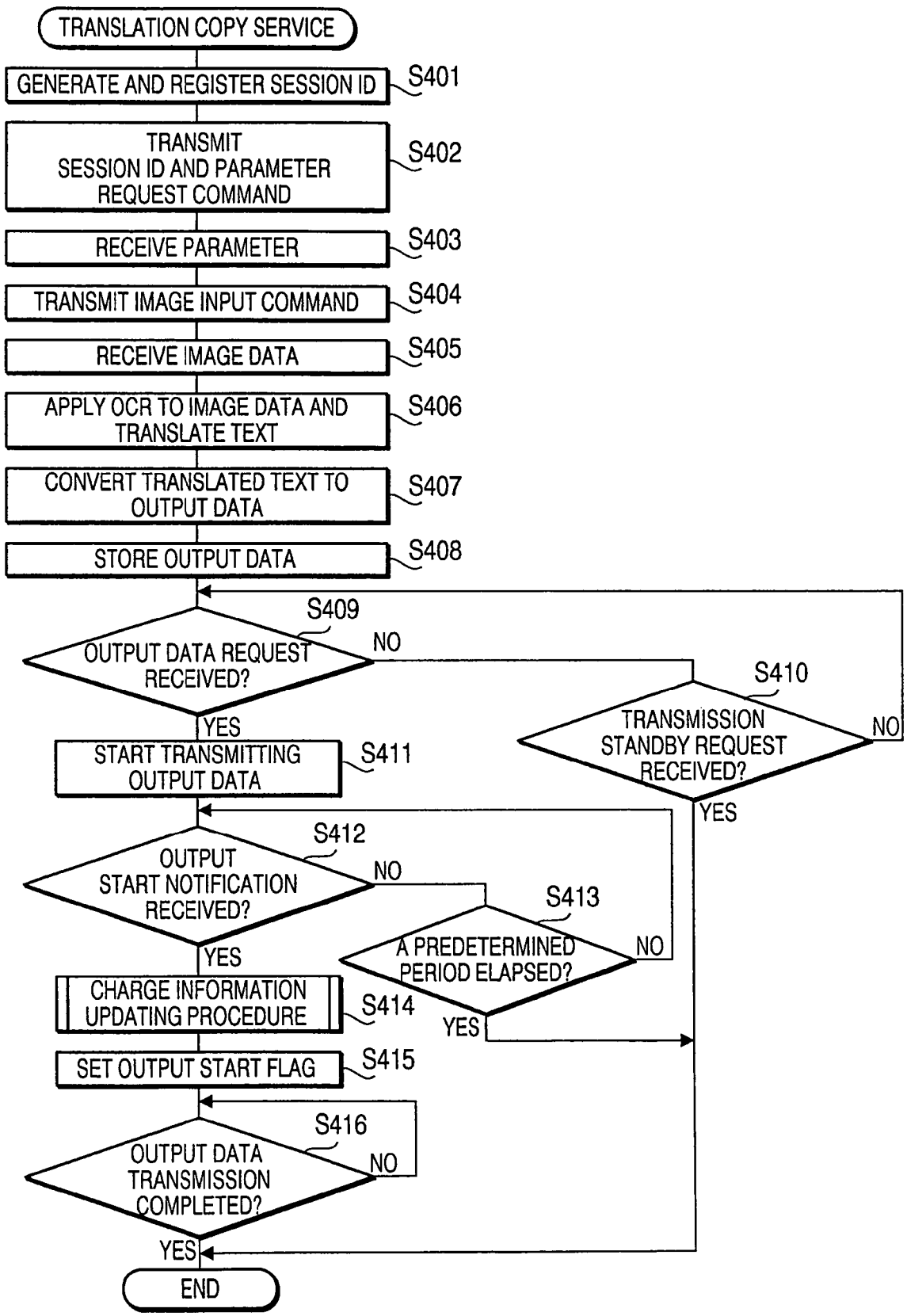
FIG. 9 is a flowchart illustrating a translation copy service according to aspects of the first embodiment.

Next, the translation copy service executed by the control unit 21 of the function server will be described referring to FIG. 9. The translation copy service is started when the service startup command is received from the MFP 10. It should be noted that the service startup command is transmitted in S101 of the service usage procedure (FIG. 5) described above.

When the translation copy service is started, in S401, the control generates a session ID for each service request and registers the same with the session management information storage unit 25 of the storage unit 23 as session management information. Specifically, as shown in FIG. 10, as the session management information, the session ID, the user ID, the file name, the service program name and an output start flag are stored in the session management information storage 25. The user ID here is the user ID transmitted together with the service startup command from the MFP 10 (i.e., the user ID of the user who requested the service). The file name here is the name of the output data to be transmitted to the MFP 10 for providing the service. The service program name is the name of the program corresponding to the requested service. The output start flag is a flag indicative of whether the output of the output data is started in the MFP 10 (0: before output; and 1: after output has been started).

In S402, the control transmits the session ID generated in S401, a parameter request command which requests the MFP 10 to set parameters necessary for the service, to the MFP 10. In S403, the control receives parameters transmitted from the MFP 10 in response to the parameter request command transmitted in S402. It should be noted that the parameters are transmitted in S105 of FIG. 5 in the service usage procedure.

Next, in S404, the control transmits an image input command that requests the MFP 10 for the image data of the original subjected to the translation copy service to the MFP 10.

Then in S405, the control receives the image data (generated by reading the original using the reading unit 13 of the MFP 10) transmitted from the MFP 10 in response to the image input command transmitted in S404. It should be noted that the image data is transmitted in S109 of the service usage procedure (FIG. 5).

In S406, the control applies an OCR (Optical Character Recognition) process to the image data received in S405 to recognize a text included in the image, and then translates the recognized text into a target language in the translation procedure based on the parameters received in S403.

Further, in S407, by setting a print layout for the text translated in S406 to generate the output data (i.e., the print data indicating the image of the text after the translation is executed). Then, in S408, the control stores the output data generated in S407 in the service output information storage unit 27 of the storage unit 23. It should be noted that the output data is kept until the deletion request is issued by the MFP 10.

In S409, the control judges whether the output data request, which is a request to transmit the output data, is received from the MFP 10. It should be noted that the output data request is transmitted in S115 of the service usage procedure (FIG. 5) described above.

In S409, if the control determines that the output data request is not received (S409: NO), the control proceeds to S410. In S410, the control judges whether the transmission standby request, which is a request to stop (pause) transmitting the output data, is received. It should be noted that the transmission standby request is transmitted in S114 of the service usage procedure (FIG. 5) described above.

If the control determines that the transmission standby request has not been received (S410: NO), the control returns to S409. That is, the control pauses until the output data request of the transmission standby request is received. If the control determines that the transmission standby request is received, the control finishes the translation copy procedure.

If, in S409, the control determines that the output data request has been received (S409: YES), the control proceeds to S411, and starts transmitting the output data (print data) generated in S407 to the MFP 10. Specifically, the control divides the print data into a plurality of pieces of data each having a predetermined data size, and subsequently transmits the data.

In S412, the control judges whether the output start notification, which indicates that the output data is started to be output, has been received from the MFP 10. It should be noted that the output start notification is transmitted in S118 of the service usage procedure (FIG. 5).

If the control determines that the output start notification has not been received (S412: NO), the control proceeds to S413. In S411, the control judges whether a predetermined period has been elapsed after transmission of the output data was started in S411. If the time period from the start of the transmission to the reception of the output start notification exceeds the predetermined period, it is determined that an error condition has occurred.

In S413, if the control determines that the predetermined period has not been elapsed (S413: NO), the control returns to S412. If the control determines that the predetermined period has elapsed (S413: YES), the control finishes the translation copy service. That is, if the output start notification is not received and the predetermined period has elapsed after the transmission of the output data was started, the control terminates the transmission of the output data.

If the control determines that the output start notification is received (S412: YES), the control proceeds to S414 and starts the charging information updating procedure. The charging information updating process will be described in detail with reference to FIG. 13.

In S415, the control sets the output start flag. Specifically, the control changes the value of the output start flag, which is stored with respect to the user ID of the user who requested the service from among the session management information stored in the session management information storage unit 25 from "0" to "1".

Then, in S416, the control determines whether the transmission of the output data has finished. If the control determines that the transmission has finished, it finishes the translation copy service.

Figure 11:
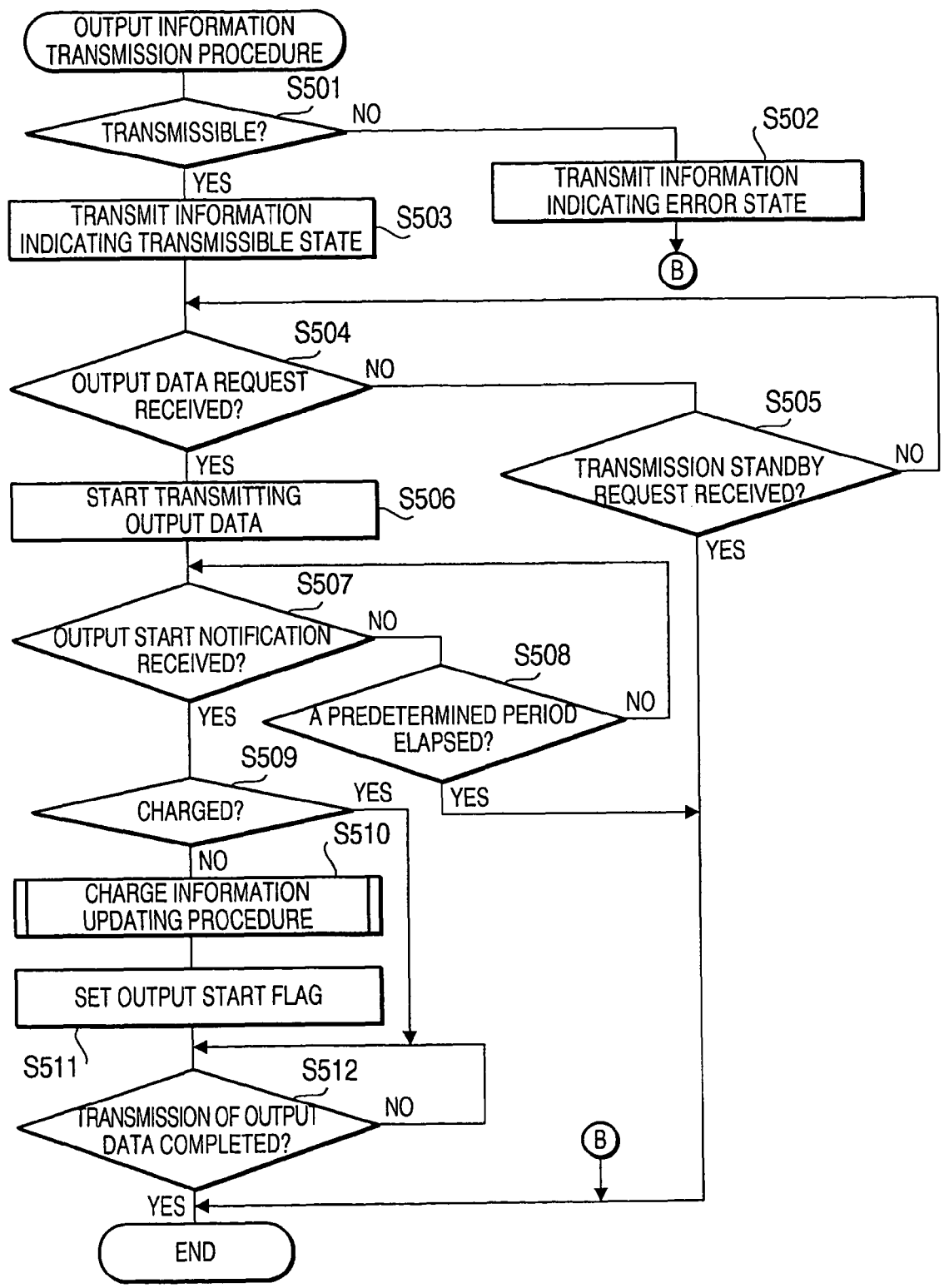
FIG. 11 is a flowchart illustrating an output information transmission procedure according to aspects of the first embodiment of the invention.

Next, the output information transmitting procedure executed by the control unit 21 of the function server 20 will be described with reference to FIG. 11. The output information transmitting procedure is started when the output command is received from the MFP 10. It should be noted that the output command is transmitted by the MFP 10 in S201 of the output information transmission requesting procedure (FIG. 7) described above.

When the output information transmitting procedure is started, the control judges whether the output data can be transmitted in S501. Specifically, for example, when the password received together with the output command was wrong or the output data corresponding to the session ID is not stored in the service output information storage unit 27 of the storage unit 23, the control determines that the output data cannot be transmitted.

If the control determines that the output data cannot be transmitted (S501: NO), the control proceeds to S502, and transmits error information to the MFP 10. Thereafter, the control finishes the output information transmitting procedure is finished.

If the control determines that the output data can be transmitted (S501: YES), the control proceeds to S503, and transmits information indicating that the output data can be transmitted to the MFP 10.

Next, the control judges whether output data request, which is a request to transmit the output data, is received from the MFP 10. It should be noted that the output data request is transmitted in S209 of the output information transmission requesting procedure (FIG. 7).

In S504, if the control determines that the output data request has not been received (S504: NO), the control proceeds to S505, and judges whether the transmission standby request, which is a request to stop transmitting the output data, is received. It should be noted that the transmission standby request is transmitted in S208 of the output information transmission requesting procedure (FIG. 7).

In S505, if the control determines that the transmission standby request has not been received (S505: NO), then the process returns to S504. That is, the control pauses until the output data request or the output standby request is received. If the control determines to receive the transmission standby request, the control finishes the output information transmitting procedure.

If the control determines that the output data request is received (S504: YES), the control proceeds to S506. In S506, the control starts a process to transmit the output data stored in the service output information storage unit 27 o the MFP 10. Specifically, referring to the session management information stored in the session management information storage unit 25, the control reads out the output data corresponding to the session ID from among the output data stored in the service output information storage unit 27 based on the file name corresponding to the session ID which is received together with the output data request, and transmits the thus read out output data.

Next, in S507, the control judges whether the output start notification which is the notification indicating whether the transmission of the output data has been started is received from the MFP 10. It should be noted that the output start notification is transmitted in S212 of the output information transmission requesting procedure (FIG. 7) described above.

If the control determines that the output start notification has not been received (S507: NO), the control proceeds to S508. In S508, the control judges whether a predetermined period has elapsed since the transmission of the output data was started in S506. If the control determines that the predetermined period has not elapsed (S508: NO), the control returns to S507. If the control determines that the predetermined period has elapsed (S508: YES), the control finishes the output information transmitting process. That is, if the predetermined period has elapsed since the transmission of the output data was started and the output start notification is received, the transmission of the output data is terminated.

However, if the control determines that the output start notification has been received (S507: YES), the process proceeds to S509. In S509, the control determines whether the charging information updating procedure (FIG. 13) has been finished. Specifically, the control refers to the session management information stored in the session management information storage unit 25 to check the value of the output start flag which is stored in association with the session ID received together with the output start notification. If the control determines that the output start flag is "1", the control determines that the charging information updating procedure has been executed, while, when the control determines the output start flag is "0", the control determines that the changing information updating procedure has not been executed.

Figure 13:
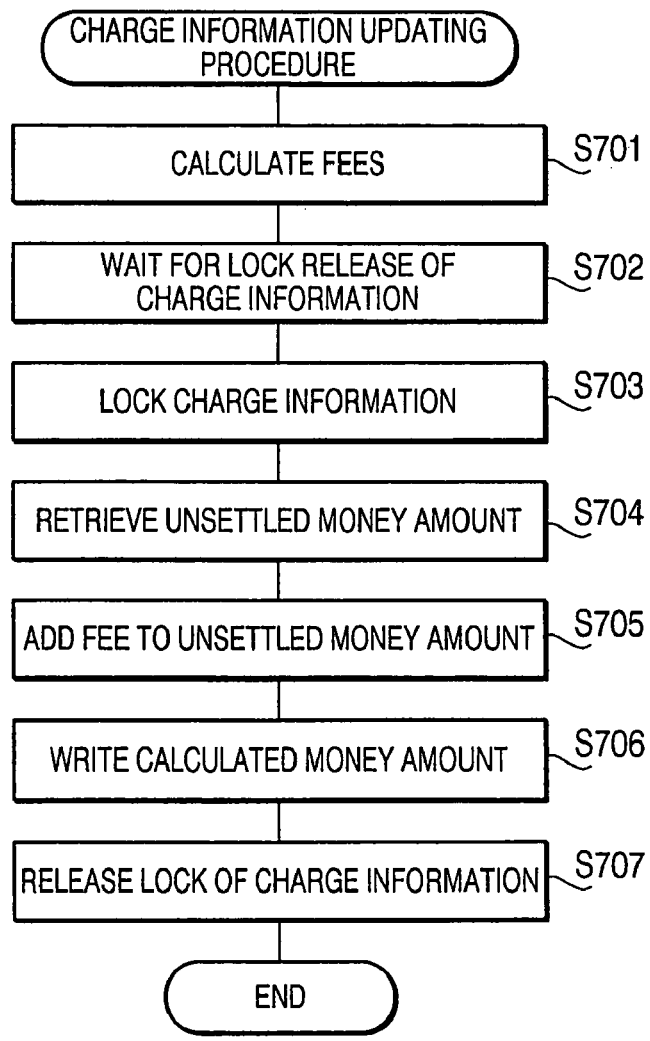
FIG. 13 is a flowchart illustrating a charge information updating procedure according to aspects of the invention.

If the control determines that the charging information updating procedure has not been executed (S509: NO), the control proceeds to S510 and executes the charging information updating procedure. The charging information updating procedure itself will be described in detail later (FIG. 13).

In S511, the control sets the output start flag. That is, the value of the output start flag which is stored in association with the user ID of the user who issued the service, among the session management information stored in the session management information storage unit 25, is set from "0" to "1". Then, the control proceeds to S512.

If the control determines that the charging information updating procedure has been executed (S509: YES), the control proceeds to S512. That is, for the output data to which the charging information updating procedure has been applied, the charge information updating procedure will not be applied again.

In S512, the control judges whether the transmission of the output data has been finished. If the control determines that the transmission of the output data has been finished, the control finishes the output information transmitting procedure.

Figure 20:
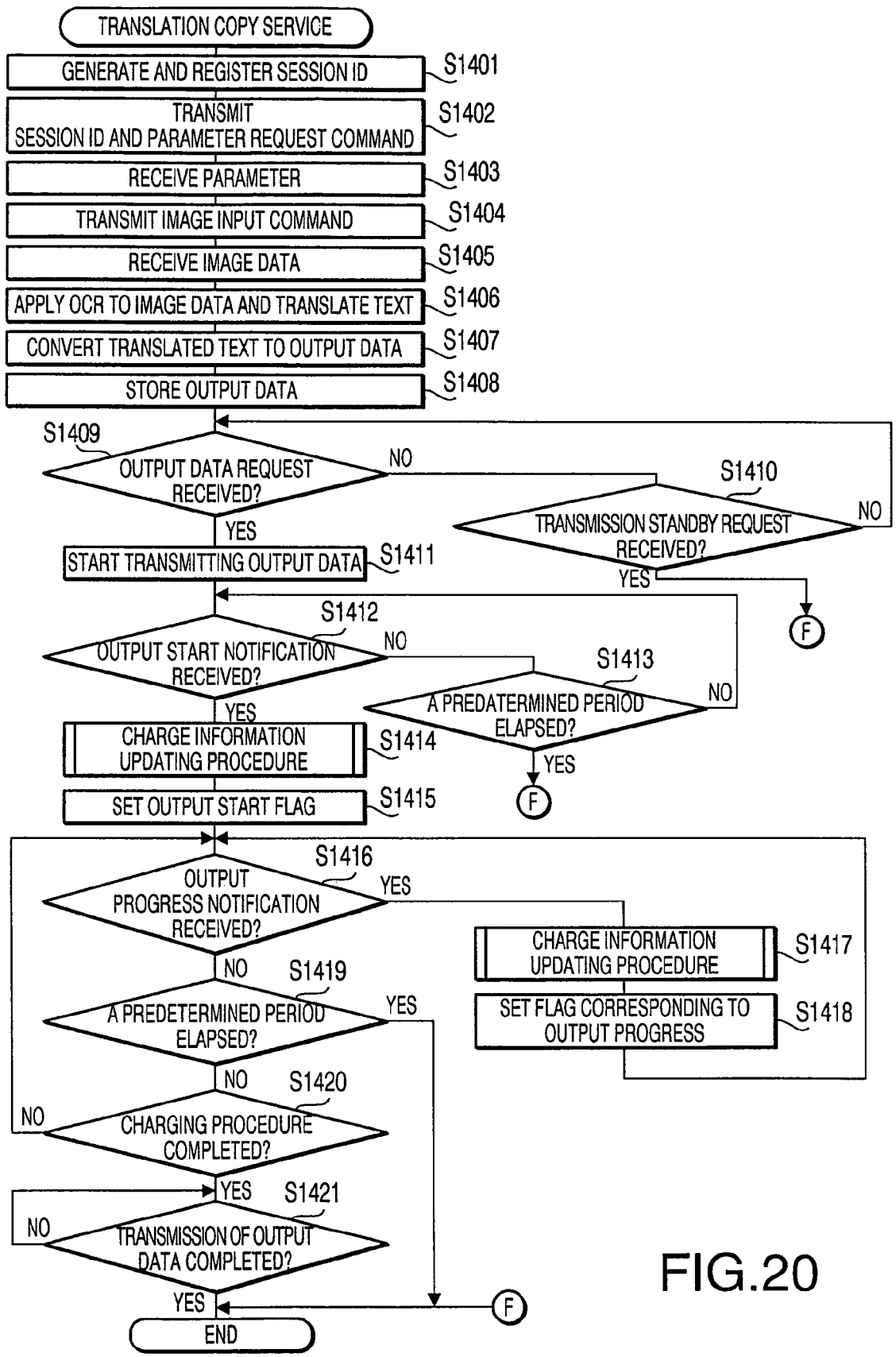
FIG. 20 is a flowchart illustrating a translation copy service procedure according to aspects of the third embodiment.

Next, the output information deleting procedure executed by the control unit 21 of the function server 20 will be described with reference to FIG. 20. The output information deleting procedure is started when the deleting command is received from the MFP 10. It should be noted that the deleting command is transmitted in S301 of the output information deletion requesting procedure (FIG. 8).

When the output information deleting procedure is started, the control judges whether the output data can be deleted in S601. Specifically, when the password the control received together with the deleting command was wrong, or when the output data corresponding to the session ID is not stored in the service output information storage unit 27 of the storage unit 23, the control determines that the output data cannot be deleted.

If the control determines that the output data cannot be deleted (S601: NO), the control proceeds to S602, and transmits information indicating an error condition. Then, the control finishes the output information deleting procedure.

If the control determines that the output data can be deleted (S601: YES), the control proceeds to S603 and deletes the output data. Specifically, the control refers to the session management information stored in the session management information storing unit 25, and based on the file name in association with the session ID which was received together with the deleting command, the control deletes the output data corresponding to the session ID among the output data stored in the service output information storing unit 27.

In S604, the control transmits information indicating that the output data has been deleted to the MFP 10. Thereafter, the control finishes the output information deleting procedure.

Next, the charging information updating procedure which is executed by the control unit 21 of the function server 20 with reference to FIG. 13 will be described. The charging information updating procedure is started when the deleting command is received from the MFP 10. It should be noted that the deleting command is transmitted in S301 of the output information deletion requesting procedure (FIG. 8) described above.

When the charging information updating procedure is started, the control calculates the fee of the output data in S701. Specifically, the control calculates the fee based on the contents of the service, the size of the output data (e.g., the number of pages to be printed), and the like.

S702, referring to the charging information stored in the charging information storage unit 24, the control pauses until the lock information, which is stored in association with the user ID of the user who has made the request, is changed to "FALSE" (i.e., non-locked status). When the lock information has changed to the "FALSE" state, the control proceeds to S703. It should be noted that the user ID of the user who made the service request is determined based on the session management information stored in the session management information storage unit 25 and the session ID received from the MFP 10.

Then, the control retrieves unsettled charging amount stored in association with the user ID of the user who made the service request from the charging information stored in the charging information. Next, the control adds the charging amount of the output data calculated in S701 to the unsettled charging amount retrieved in S704.

Next, in S705, the control writes the added amount calculated in S705 as the unsettled charging amount (S706). That is, the control updates the unsettled charging amount. Lastly, the control rewrites the lock information, which was set to "TRUE" (i.e., rocked state) in S703 to "FALSE". That is, the control releases the locked status of the charging information. Thereafter, the control finishes the charging information updating procedure.

As described above, according to the first embodiment, the MFP 10 notifies the function server 20 of the start of output of the output data (S118). The function server 20 executes the charging procedure regarding the output data (S414) when it receives the notification from the MFP 10 (S412: YES). According to the above configuration, in comparison with a case where the charging procedure is executed after the output data has been output, the misbehavior can be prevented. That is, according to a configuration which starts the charging procedure after the output data has been completely output, by interrupting the outputting operation immediately before the output operation is completed, it becomes possible that a user obtain most part of the output but the charging procedure will not be executed.

According to the first embodiment described above, when the output of the output data is started, the charging procedure is executed. Therefore, it is ensured that for the which is started to be output, the charging procedure is executed. Thus, the misbehavior as in the conventional configuration can be well prevented.

According to the first embodiment, however, when the output of the data cannot be completed due to some trouble after the outputting of the same has been started, the charging procedure is executed but the user may not obtain the normal output. To avoid such a condition, the first embodiment is configured such that the output data stored in the function server 20 can be retransmitted to the MFP 10 upon request by the MFP 10 (see FIGS. 7 and 11). In such a case, if the charging procedure has been executed for the retransmitted data, the charging procedure therefor will not be executed again (S509). Therefore, according to the first embodiment, it is ensured that the data, for which the charging procedure is executed, is output, and no disadvantage will be given to the user of the MFP 10.

Second Embodiment

Hereinafter, the printing system according to a second embodiment will be described. The printing system according to the second embodiment has substantially the same hardware configuration as the first embodiment. In the first embodiment, the charging procedure is executed when the output data is started to be output. According to the second embodiment, the charging procedure is executed after the output of the output data is executed by a certain degree but before the completion thereof. Therefore, according to the second embodiment, the service usage procedure (FIG. 5), the output information transmission requesting procedure (FIG. 7), the translation copy service (FIG. 9) and output information transmitting procedure (FIG. 11) are replaced with procedures shown in FIGS. 14, 15, 16 and 17, respectively.

Further, in the session management information storage unit 25, instead of the output start flag of the session management information (FIG. 10), an output progress flag indicative of whether output of the output data has been completed by a predetermined degree. Since the hardware configuration and setting of the flag are substantially similar to the first embodiment, description there of will be omitted for brevity.

Figure 14:
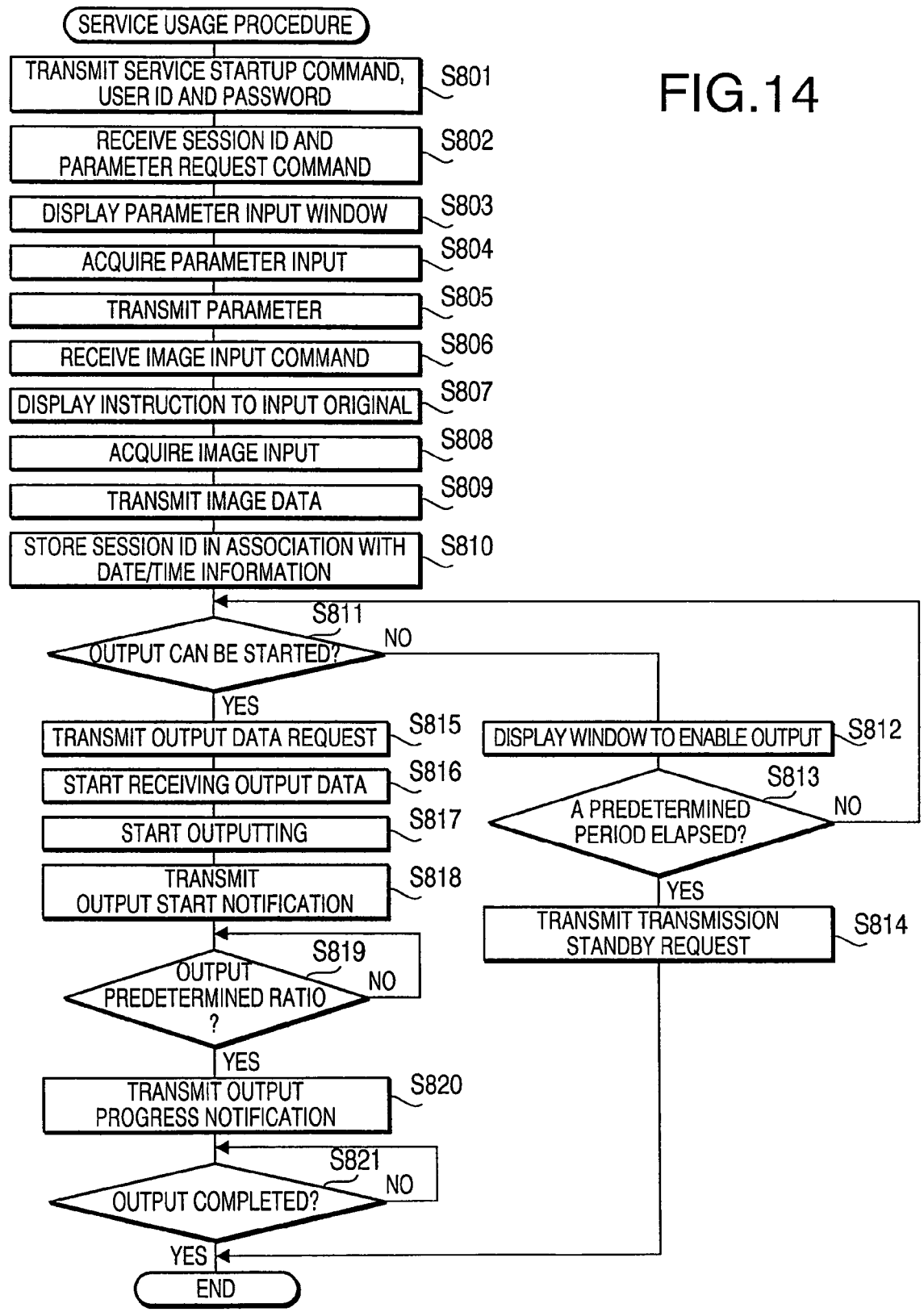
FIG. 14 is a flowchart illustrating a service usage procedure according to aspects of a second embodiment.

Firstly, the service usage procedure executed by the control unit 11 of the MFP 10 according to the second embodiment will be described with reference to FIG. 14. It should be noted that the service usage procedure is fundamentally similar to that of the first embodiment (see FIG. 5). Specifically, S801-S818 and S821 correspond to S101-S119, respectively. In other words, the service usage procedure illustrated in FIG. 14 is different from that shown in FIG. 5 by that steps S819 and S820 are added. Therefore, in the following description, the steps similar to those of the first embodiment will be omitted.

When the service usage procedure shown in FIG. 14 is started, in S801, the control transmits the service startup command, user ID and password to the function server 20. In S802, the control receives the session ID and parameter request command which are transmitted from the function server 20.

Next, in S803, in accordance with the parameter request command received in S802, the control displays a parameter input window on the display 52 of the operation panel 12a. Next, S804, the control pauses until the user selects a parameter through the parameter input window displayed on the display 52. When the user selects a parameter, the control proceeds to S805.

In S805, the control transmits the parameter selected in S804 to the function server 20. In S806, the control receives the image input command which is transmitted from the function server 20.

In S807, the control displays a message asking the user to make the reading unit 13 read the original subjected to be the translation copy service on the display 52 of the operation unit 12a. Then, in S808, the control pauses till the reading of the original is completed. Upon completion, the control proceeds to S809.

In S809, the control transmits the image data representing the image read from the original in S808 to the function server 20. Then, in S810, the control stores the session ID received in S802 in association with the current date/time in the storage unit 16.

In S811, the control judges whether the output data transmitted from the function server 20 later can be output. If the control determines that the output data cannot be output (S811: NO), the control proceeds to S812, and displays a message asking the user to perform necessary operation to enable the output of the output data on the display 52 of the operation panel 12a.

In S813, the control determines whether a predetermined period has passed since the control determined that the output data could not be output in S811 firstly. If the control determines that the predetermined period has not elapsed (S813: NO), the control returns to S811. If the control determines that the predetermined period has elapsed (S813: YES), the control proceeds to S814, and transmits the transmission standby request to the function server. Thereafter, the control finishes the service usage procedure.

If the control determines that the output data can be output (S811: YES), the control proceeds to S815 and transmits an output data request to the function server 20.

Next, in S815, the control starts receiving the output data transmitted form the function server 20. In S817, the control starts outputting the output data received from the function server 20.

In S818, the control transmits the output start notification to the function server 20. Then, in S819, the control judges whether the output of the output data has been executed by a predetermined ratio. If the predetermined ratio of the output data has been completed, the control proceeds to S820. It should be noted that a case where the predetermined ratio of the output data is output is, for example, the 10% of the output data is output, a predetermined number of a plurality of pages of images are output, and the like. In other words, the control determines that the output of the data reaches a predetermined stage from the start of outputting and before the completion thereof.

In S820, the control transmits the output progress notification indicating that the output of the output data has been executed by the predetermined ratio to the function server. Then, the function server 20 executes the charging procedure.

Next, in S821, the control judges whether the output of the output data has been completed. If the control determines that the output of the output data has been completed, it finishes the service usage procedure.

Figure 15:
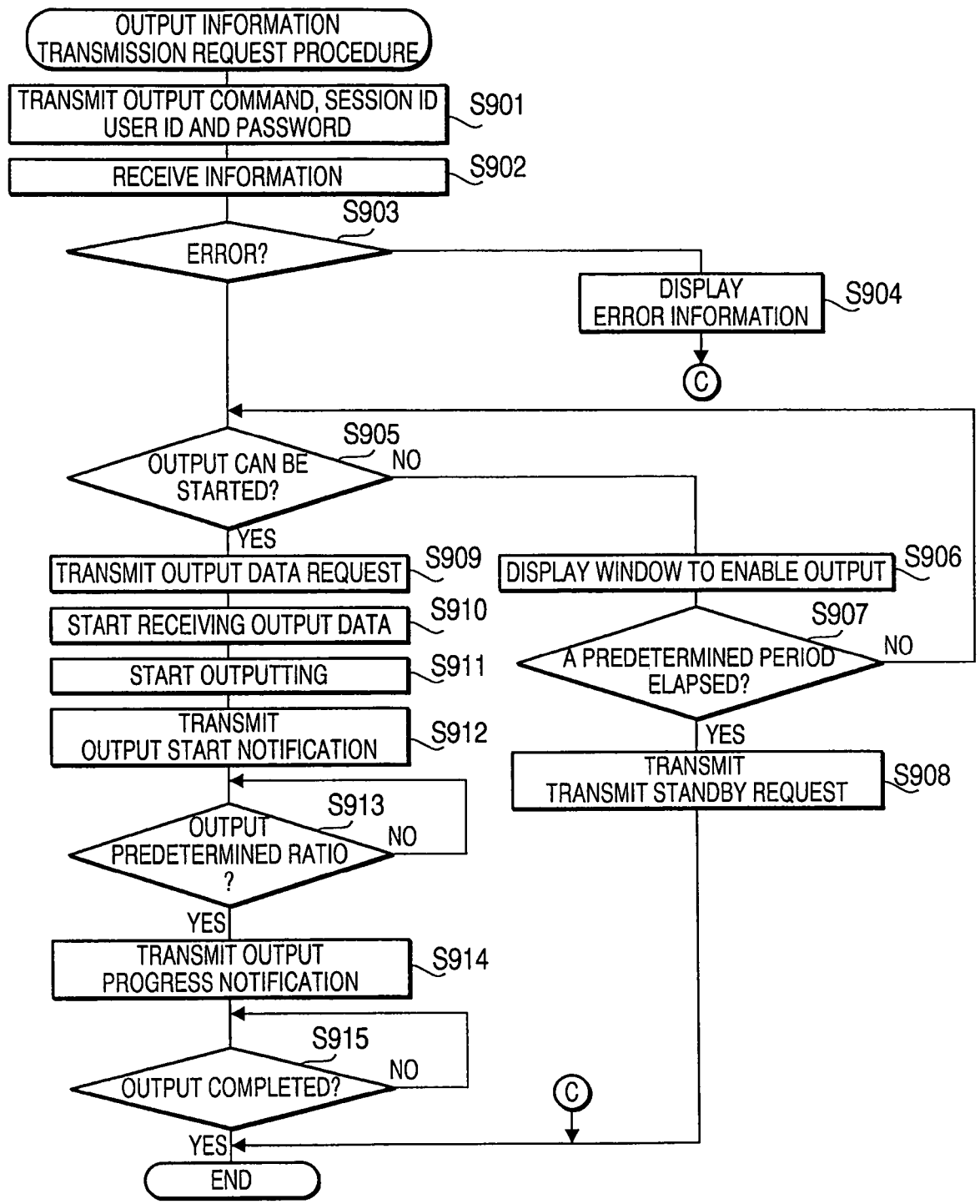
FIG. 15 is a flowchart illustrating an output information transmission request procedure according to aspects of the second embodiment.

Next, the output information transmission requesting procedure will be described with reference to FIG. 15. It should be noted that the output information transmission requesting procedure is substantially similar to that of the first embodiment (see FIG. 7). Specifically, S901-S912 and S915 (FIG. 15) correspond to S201-S213 (FIG. 7), respectively. That is, the procedure shown in FIG. 15 is different from the procedure shown in FIG. 7 by that steps S913 and S914 are added. In the following description of FIG. 15, steps similar to those of FIG. 7 will be described briefly for the brevity.

When the output information transmission requesting procedure is executed, the control transmits the session ID, user ID and password to the function server 20 in S901. Then, the control receives the information transmitted from the function server 20 in S902.

In S903, the control judges whether the information received in S902 represent an error status. If the control determines that the information received in S902 represent the error status (S903: YES), the control proceeds to S904, and displays an error message on the display 52 of the operation panel 12a. Then the control finishes the output information transmission requesting procedure.

If the control determines that the information does not represent the error status (S903: NO), the control proceeds to S905, and judges whether the MFP 10 can output the output data transmitted form the function server 20 later.

If the control determines that the output data cannot be output (S905: NO), the control proceeds to S905, and displays a message asking the user to take necessary steps to enable the output of the output data on the display 52 of the operation unit 12a.

In S907, the control judges whether a predetermine period has passed since it fist determined that the output data could not output in S905.

If the control determines that the predetermined period has not elapsed since the control first determined that the output data cannot be output (S907: NO), the control returns to S905. If the control determines that the predetermined period has elapsed (S907: YES), the control proceeds to S908, and transmits the transmission standby request to the function server 20.

If the control determines that the output data can be output (S905: YES), the control proceeds to S909, and transmits the output data request to the function server 20.

In S910, the control starts receiving the output data transmitted from the function server. In S911, the control further starts outputting the output data.

In S912, the control transmits the output start notification to the function server 20. Then, in S913, the control judges whether the output of the output data has been completed by the predetermined ratio, and if the control determines that the predetermined ratio of the output data has been output (S913: YES), the control proceeds to S914.

In S914, the control transmits the progress notification to notify the function server 20 of the fact that the predetermined ratio of the output data has been output to the function server 20. In S915, the control judges whether the output of the output data has been completed. If the output has been completed (S915: YES), the control finishes the output information transmission requesting procedure.

Figure 16:
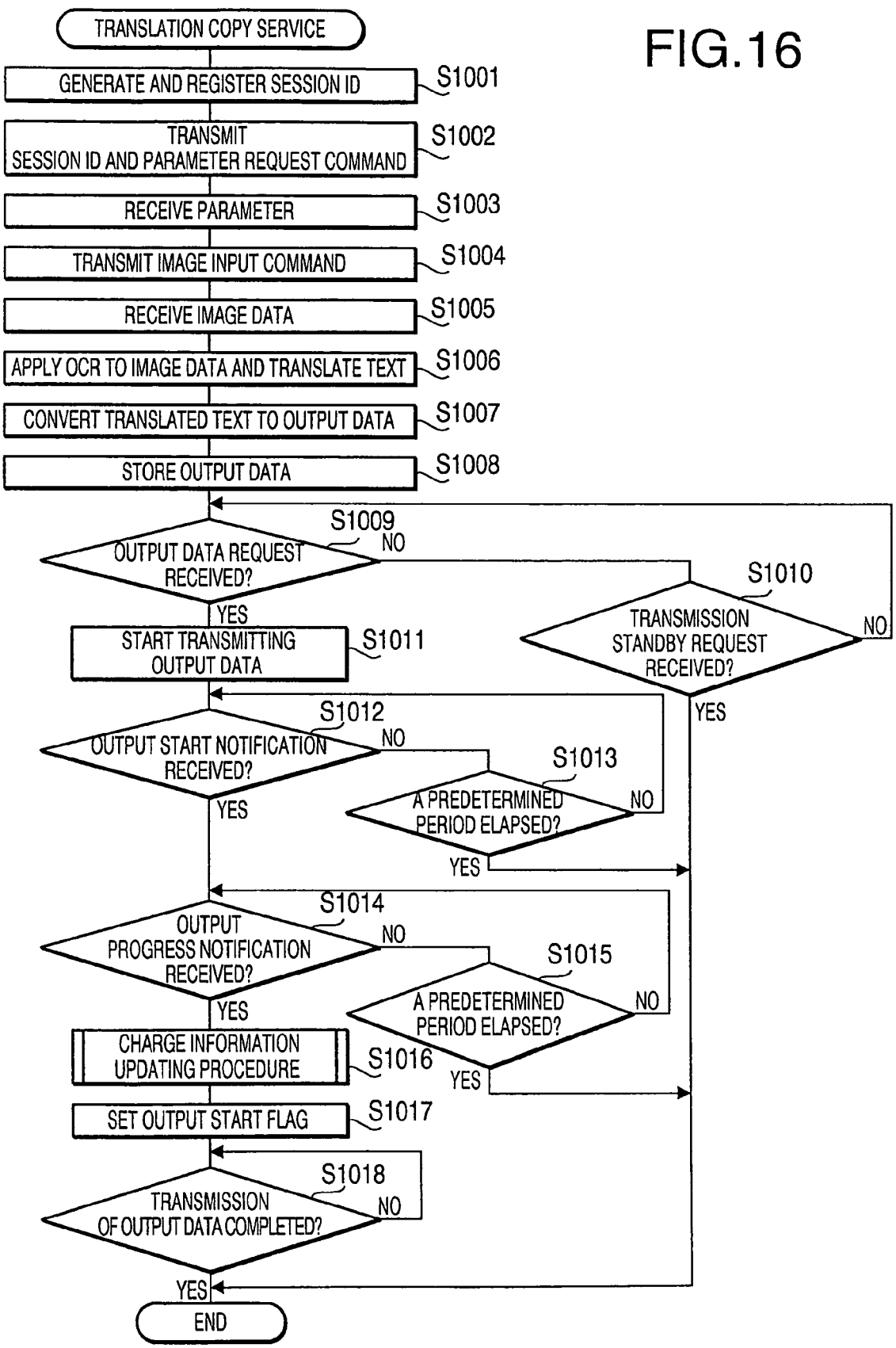
FIG. 16 is a flowchart illustrating a translation copy service according to aspects of the second embodiment.

Next, the translation copy service according to the second embodiment will be described with reference to FIG. 16. It should be noted that the translation copy service shown in FIG. 16 is substantially similar to that of the first embodiment shown in FIG. 9. Specifically, S1001-S1013, S1016 and S1018 of FIG. 16 correspond to S410-S414 and S416, respectively. The translation copy service show in FIG. 16 is different from that shown in FIG. 9 in that S1017 is executed instead of S415. Therefore, for the steps similar to those of the first embodiment, only brief description will be provided for the brevity.

When the translation copy service is started, in S1001, the control generates a session ID and register the thus generated session ID with the session management information storage unit 25 as the session management information.

In S1002, the control transmits the session ID and parameter request command to the MFP 10. In S1003, the control receives the parameters transmitted from the MFP 10.

In S1004, the control transmits the image input command to the MFP 10. In S1005, the control receives the image data transmitted from the MFP 10. In S1006, the control recognizes the text included in the image by applying the OCR process to the image data received in S1005, and translates the text thus recognized into a target language.

In S1007, the control sets a print layout for the text translated in S1006, thereby generating the output data (i.e., print data representing the translated text).

In S1008, the control stores the output data generated in S1007 in the service output information storage unit 27 of the storage unit 23. In S1009, the control judges whether the output data request is received from the MFP 10.

If the control determines that the output data request is not received from the MFP 10 (S1009: NO), the control proceeds to S1010, and judges whether the transmission standby request is received.

If the control determines that the transmission standby request is not received (S1010: NO), the control returns to S1009. If the transmission standby request has been received (S1010: YES), the control finishes the translation copy service.

If the control determines that the output data request is received (S1009: YES), the control proceeds to S1011, and starts transmitting the output data generated in S1007 to the MFP 10.

In s1012, the control judges whether the output start notification is received from the MFP 10. If the control determines that the output start notification is not received (S1012: NO), the control proceeds to S1013, and judges whether a predetermined period has passed since the transmission of the output data was started in S1011.

If the control determines that the predetermined period has not passed (S1013: NO), the control returns to S1012. If the control determines that the predetermined period has passed (S1013: YES), the control finishes the translation copy service.

If the control determines that the output start notification has been received (S1012: YES), the control proceeds to S1014, and determines whether the output progress notification indicating the predetermined ratio of the output data has been output is received from the MFP 10.

If the control determines that the output progress notification has not been received (S1014: NO), the control proceeds to S1015. In S1015, the control judges whether the predetermined period has elapsed since output start notification was received in S1012.

If the control determines that the predetermined period has not elapsed (S1015: NO), the control returns to S1014. If the control determines that the predetermined period ahs elapsed (S1015: YES), the control finishes the translation copy service. That is, if the output progress notification is not received although the predetermined period has passed since the output start notification was received, output of the output data is terminated.

If the control determines that the output progress notification is received (S1014: YES), the control proceeds to S1016 and the charging information updating procedure (FIG. 13) is executed.

Next, in S1017, the control sets the output progress flag. Specifically, from among the session management information stored in the session management information storage unit 25, the output progress flag stored in association with the user ID of the user who requested the service is changed from "0" to "1".

Next, in S1018, the control judges whether the transmission of the output data has been completed. If the control determines that the transmission of the output data has been completed (S1018: YES), the control finishes the translation copy service.

Figure 17:
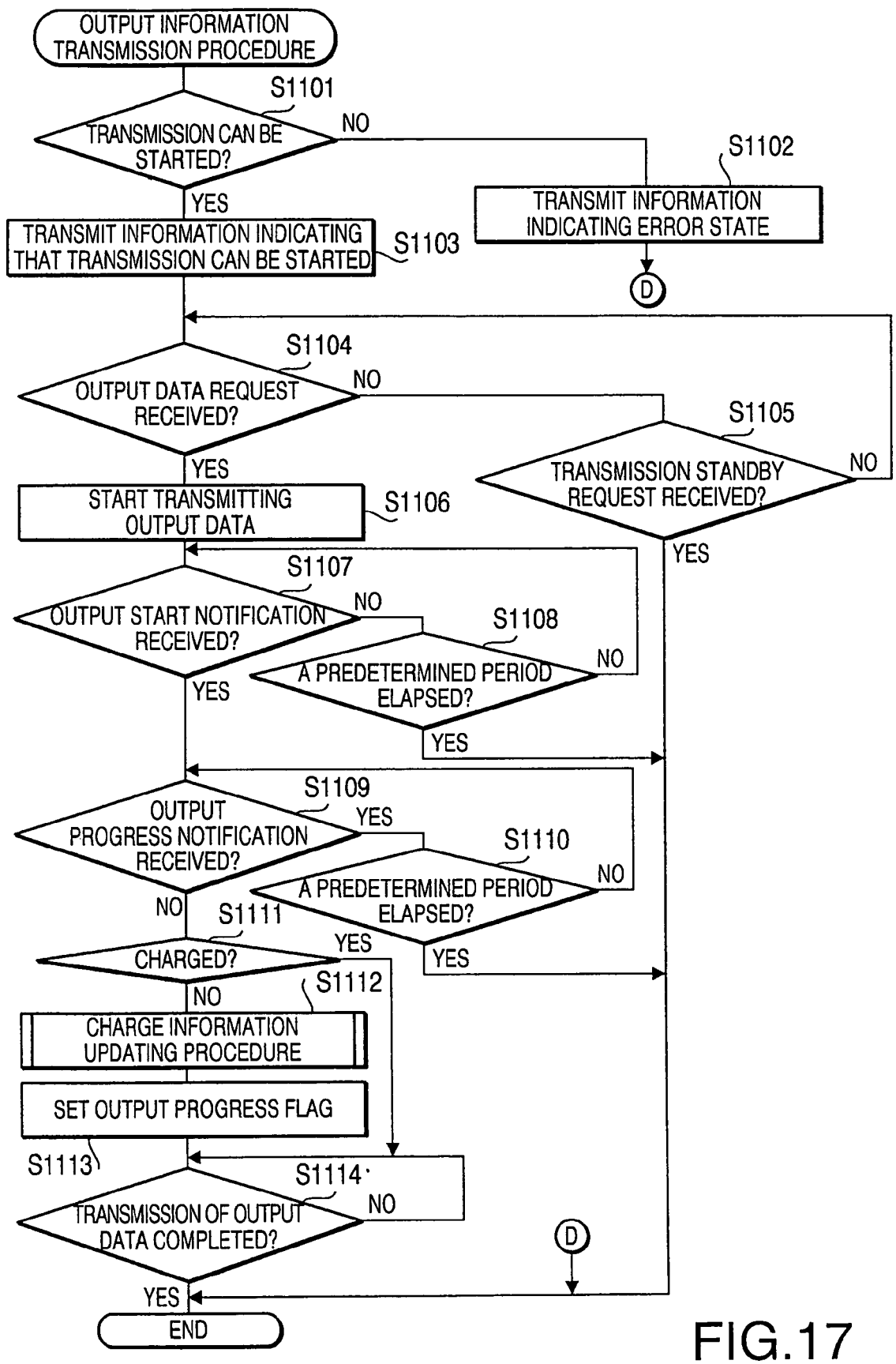
FIG. 17 is a flowchart illustrating an output information transmission procedure according to aspects of the second embodiment.

Next, the output information transmitting procedure according to the second embodiment will be described. The output information transmitting procedure according to the second embodiment shown in FIG. 17 is substantially similar to that of the first embodiment shown in FIG. 11. That is, S1101-S1108, S1111, S1112 and S1114 correspond to S501-S510 and S512, respectively. Thus, the output information transmitting procedure shown in FIG. 17 is different from that shown in FIG. 11 in that the S1109 and S1110 are added, and S1113 is executed instead of S511. In this regard, the steps similar to those in FIG. 11 are described briefly for brevity.

When the output information transmitting procedure is started, the control judges whether the output data can be transmitted in S1101. If the control determines that the output data cannot be transmitted (S1101: NO), the control proceeds to S1102 and transmits error information indicating an error status to the MFP 10. Then, the control finishes the output information transmitting procedure.

If the control determines that the output data can be transmitted (S1101: YES), the control proceeds to S1103, and transmits the information indicating that the output data can be transmitted to the MFP 10. Then, in S1104, the control judges whether the output data request is received from the MFP 10.

If the control determines that the output data request has not been received (S1104: NO), the control judges whether the transmission standby request is received in S1105. If the control determines that the transmission standby request has not been received (S1105: NO), the control returns to S1104.

If the control determines that the transmission standby request is received (S1105: YES), the control finishes the output information transmitting procedure.

If the control determines that the output data request has been received (S1104: YES), control proceeds to S1106, and starts transmitting the output data stored in the service output information storage unit 27 to the MFP 10.

Next, in S1107, the control judges whether the output start notification is received from the MFP 10. If the control determines that the output start notification has not been received (S1107: NO), the control proceeds to S1108, and judges whether a predetermined period has passed after the transmission of the output data was started in S1106.

If the control determines that the predetermined period has not passed (S1108: NO), the control returns to S1107. If the control determines that the predetermined period has passed (S1108: YES), the control finishes the output information transmitting procedure.

If the control determines that the output start notification is received (S1107: YES), the control proceeds to S1109 and judges whether the output progress notification, which indicates that a predetermined ratio of output data has been output, is received from the MFP 10.

If the output progress notification has not been received (S1109: NO), the control proceeds to S1110, and judges whether the predetermined period has passed since the output start notification was received in S1107.

If the control determines that the predetermined period has not passed (S1110: NO), the control returns to S1109. If the control determines that the predetermined period has passed (S1110: YES), the control finishes the output information transmitting procedure. That is, if the output start notification was received by the output progress notification has not been received during the predetermined period, the control stops transmitting the output data.

If the control determines that the output progress notification is received (S1109: YES), the control proceeds to S111, and judges whether the charging information updating procedure (FIG. 13) has been executed with respect to the current output data.

If the control determines that the charging information updating procedure has not been executed (S1111: NO), the control proceeds to S1112 and executes the charging information updating procedure.

In S1113, the control sets the output progress flag, and then proceeds to S1114.

In S1114, the control judges whether the transmission of the output data has been completed. If the control determines that the transmission of the output data has been completed (S1114: YES), the control finishes the output information transmitting procedure.

As described above, with the printing system according to the second embodiment, the MFP 10 notifies the function server 20 of a predetermined ratio of output data has been output (S820). The function server 20, when receives the notification (S1014: YES), starts the charging procedure regarding the output data (S1016). Thus, according to the printing system, in comparison with a case where the charging procedure is started after the output is completed, the charging is started at an earlier stage, and thus misbehavior can be suppressed. In particular, if the printing system is configured such that the charging procedure is executed before the main portion of the output data is output, the misbehavior can be effectively suppressed. It should be noted that, according to the second embodiment, since the charging operation is executed after certain amount of output data is output. Therefore, in comparison with the first embodiment in which the charging procedure is started when the output is started, the amount of charge can be made appropriate even if outputting of the output data is prevented after the output of the data is started.

It should be noted that when the charging procedure is started may be differentiated depending on the services. For example, when data represents one cover page and subsequent body pages is output, the charging procedure may be executed for second and subsequent pages. Further, if bibliographical data is printed on the last page, the charging procedure may be executed before the last page is printed.

Further, in the printing system according to the second embodiment, similarly to the first embodiment, the output data the function server 20 stores can be retransmitted upon request from the MFP 10 (FIGS. 15 and 17). In such a case, for the output data for which the charging procedure is executed will not be charge again (S1111). Therefore, it is ensured that the user can obtain the output of the output data for which the charging procedure has been executed so that disadvantage will not be provided to the user.

Third Embodiment

Next, the printing system according to a third embodiment will be described. The configuration of the third embodiment is substantially similar to that of the first embodiment. Significantly, according to the first embodiment, the charging procedure is executed as a whole when the output of the output data is started. According to the third embodiment, the charging procedure is executed gradually in accordance with the progress of output of the output data.

To realize the above, according to the third embodiment, the service usage procedure (FIG. 5), the output information transmission requesting procedure (FIG. 7), the translation copy service (FIG. 9), and the output information transmitting procedure (FIG. 11) are replaced with the same shown in FIGS. 18, 19, 20 and 21, respectively. Further, in the session management information storage unit 25 of the function server 20, instead of the output start flag of the session management information (FIG. 10), output progress flags indicating the progress of the output of the output data on the MFP 10 are stored. Specifically, according to the third embodiment, there are four output progress flags which include: a first flag indicating whether 25% of output data has been output; a second flag indicating whether 50% of output data has been output; and a third flag indicating whether 75% of output data has been output. The other configurations and procedures are similar to those of the first embodiment and will not be described in detail for the brevity.

Figure 18:
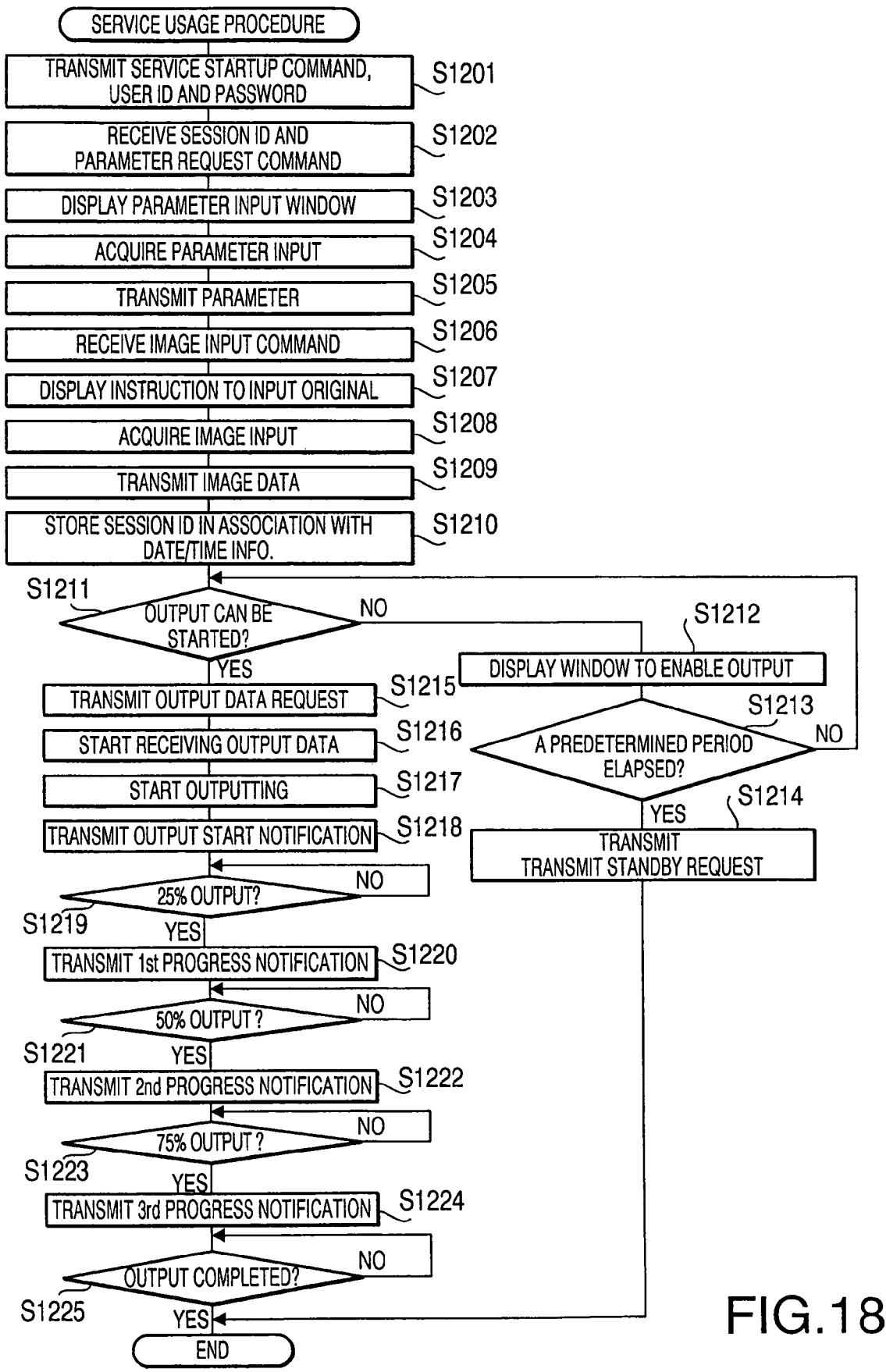
FIG. 18 is a flowchart illustrating a service usage procedure according to aspects of a third embodiment.

Firstly, the service usage procedure executed by the control unit 11 of the MFP 10 according to the second embodiment will be described with reference to FIG. 18. It should be noted that the service usage procedure is fundamentally similar to that of the first embodiment (see FIG. 5). Specifically, S1201-S1218 and S1225 correspond to S101-S119, respectively. In other words, the service usage procedure illustrated in FIG. 18 is different from that shown in FIG. 5 by that steps S1219-S1224 are added. Therefore, in the following description, the steps similar to those of the first embodiment (FIG. 5) will be omitted.

When the service usage procedure shown in FIG. 18 is started, in S1201, the control transmits the service startup command, user ID and password to the function server 20. In S1202, the control receives the session ID and parameter request command which are transmitted from the function server 20.

Next, in S1203, in accordance with the parameter request command received in S1202, the control displays a parameter input window on the display 52 of the operation panel 12*a*. Next, in S1204, the control pauses until the user selects a parameter through the parameter input window displayed on the display 52. When the user selects a parameter, the control proceeds to S1205.

In S1205, the control transmits the parameter selected in S1204 to the function server 20. In S1206, the control receives the image input command which is transmitted from the function server 20.

In S1207, the control displays a message asking the user to make the reading unit 13 read the original subjected to be the translation copy service on the display 52 of the operation unit 12*a*. Then, in S1208, the control pauses till the reading of the original is completed. Upon completion, the control proceeds to S1209.

In S1209, the control transmits the image data representing the image read from the original in S1208 to the function server 20. Then, in S1210, the control stores the session ID received in S1202 in association with the current date/time in the storage unit 16.

In S1211, the control judges whether the output data transmitted from the function server 20 later can be output. If the control determines that the output data cannot be output (S1211: NO), the control proceeds to S1212, and displays a message asking the user to perform necessary operation to enable the output of the output data on the display 52 of the operation panel 12*a*.

In S1213, the control determines whether a predetermined period has passed since the control determined that the output data could not be output in S1211 firstly. If the control determines that the predetermined period has not elapsed (S1213: NO), the control returns to S1211. If the control determines that the predetermined period has elapsed (S1213: YES), the control proceeds to S1214, and transmits the transmission standby request to the function server. Thereafter, the control finishes the service usage procedure.

If the control determines that the output data can be output (S1211: YES), the control proceeds to S1215 and transmits an output data request to the function server 20.

Next, in S1215, the control starts receiving the output data transmitted form the function server 20. In S1217, the control starts outputting the output data received from the function server 20.

In S1218, the control transmits the output start notification to the function server 20. Then, in the function server 20, the charging procedure for charging a part of the charge for the entire output data (e.g., 25% of the entire fee) is executed.

In S1219, the control judges whether the output of 25% of the output data has been executed. If output of 25% of the output data has been completed (S1219: YES), the control proceeds to S1220.

In S1220, a first output progress notification for notifying of completion of 25% of output of the output data is transmitted to the function server 20. Upon receipt of this first output progress notification, the function server 20 executes the charging procedure of charging a part (e.g., 25% in this embodiment) of the entire fee is charged.

In S1221, the control judges whether the output of 50% of the output data has been executed. If output of 50% of the output data has been completed (S1221: YES), the control proceeds to S1222.

In S1222, a second output progress notification for notifying of completion of 50% of output of the output data is transmitted to the function server 20. Upon receipt of this second output progress notification, the function server 20 executes the charging procedure of charging a part (e.g., 50% in this embodiment) of the entire fee is charged.

In S1223 the control judges whether the output of 75% of the output data has been executed. If output of 75% of the output data has been completed (S1223: YES), the control proceeds to S1224.

In S1224, a third output progress notification for notifying of completion of 75% of output of the output data is transmitted to the function server 20. Upon receipt of this third output progress notification, the function server 20 executes the charging procedure of charging a part (e.g., 75% in this embodiment) of the entire fee is charged.

Next, in S1225, the control judges whether the output of the output data has been completed. If the control determines that the output of the output data has been completed, it finishes the service usage procedure.

Figure 19:
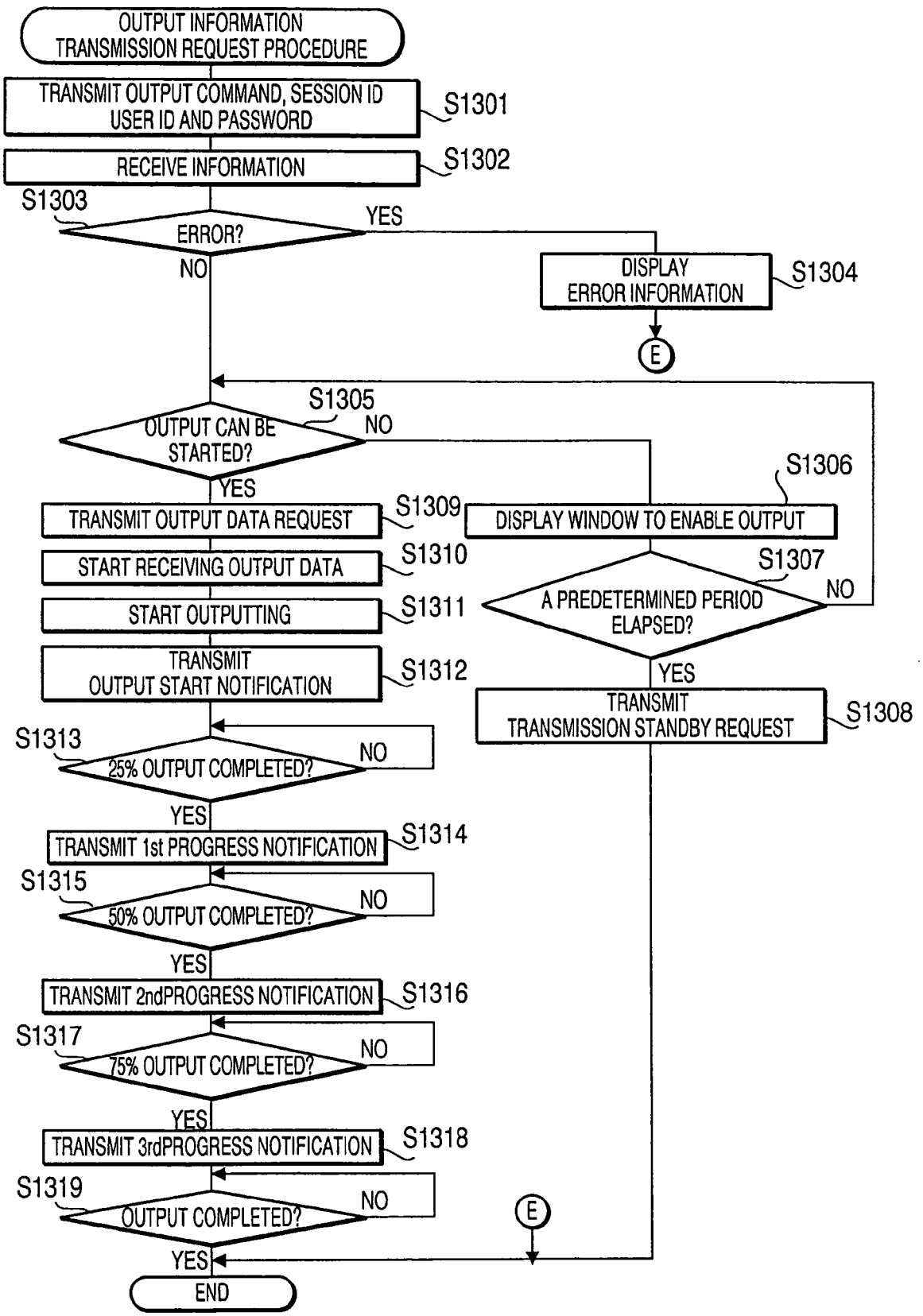
FIG. 19 is a flowchart illustrating an output information transmission request procedure according to aspects of a third embodiment.

Next, the output information transmission requesting procedure will be described with reference to FIG. 19. It should be noted that the output information transmission requesting procedure is substantially similar to that of the first embodiment (see FIG. 7). Specifically, S1301-S1312 and S1319 (FIG. 19) correspond to S201-S213 (FIG. 7), respectively. That is, the procedure shown in FIG. 19 is different from the procedure shown in FIG. 7 by that steps S1313-S1318 are added. In the following description of FIG. 19, steps similar to those of FIG. 7 will be described only briefly for the brevity.

When the output information transmission requesting procedure is executed, the control transmits the session ID, user ID and password to the function server 20 in S1301. Then, the control receives the information transmitted from the function server 20 in S1302.

In S1303, the control judges whether the information received in S1302 represent an error status. If the control determines that the information received in S1302 represent the error status (S1303: YES), the control proceeds to S1304, and displays an error message on the display 52 of the operation panel 12a. Then the control finishes the output information transmission requesting procedure.

If the control determines that the information does not represent the error status (S1303: NO), the control proceeds to S1305, and judges whether the MFP 10 can output the output data transmitted form the function server 20 later.

If the control determines that the output data cannot be output (S1305: NO), the control proceeds to S1305, and displays a message asking the user to take necessary steps to enable the output of the output data on the display 52 of the operation unit 12a.

In S1307, the control judges whether a predetermine period has passed since it fist determined that the output data could not output in S1305.

If the control determines that the predetermined period has not elapsed since the control first determined that the output data cannot be output (S1307: NO), the control returns to S1305. If the control determines that the predetermined period has elapsed (S1307: YES), the control proceeds to S1308, and transmits the transmission standby request to the function server 20.

If the control determines that the output data can be output (S1305: YES), the control proceeds to S1309, and transmits the output data request to the function server 20.

In S1310, the control starts receiving the output data transmitted from the function server. In S1311, the control further starts outputting the output data.

In S1312, the control transmits the output start notification to the function server 20. Then, in S1313, the control judges whether 25% of the output of the output data has been completed by the predetermined ratio, and if the control determines that 25% of the output data has been output (S1313: YES), the control proceeds to S1314.

In S1314, the control transmits the first progress notification to notify the function server 20 of the fact that 25% of the output data has been output to the function server 20. has been completed by the predetermined ratio, and if the control determines that 50% of the output data has been output (S1315: YES), the control proceeds to S1316.

In S1316, the control transmits the second progress notification to notify the function server 20 of the fact that 50% of the output data has been output to the function server 20.

In S1317, the control judges whether 75% of the output of the output data has been completed by the predetermined ratio, and if the control determines that 75% of the output data has been output (S1317: YES), the control proceeds to S1318.

In S1318, the control transmits the second progress notification to notify the function server 20 of the fact that 75% of the output data has been output to the function server 20.

In S1319, the control judges whether the output of the output data has been completed. If the output has been completed (S1319: YES), the control finishes the output information transmission requesting procedure.

Next, the translation copy service according to the third embodiment will be described with reference to FIG. 20. It should be noted that the translation copy service shown in FIG. 20 is substantially similar to that of the first embodiment shown in FIG. 9. Specifically, S1401-S1415, S1421 of FIG. 20 correspond to S401-S416, respectively. The translation copy service show in FIG. 20 is different from that shown in FIG. 9 in that S1416-S1420 are added. Therefore, for the steps similar to those of the first embodiment, only brief description will be provided for the brevity.

When the translation copy service is started, in S1401, the control generates a session ID and register the thus generated session ID with the session management information storage unit 25 as the session management information.

In S1402, the control transmits the session ID and parameter request command to the MFP 10. In S1403, the control receives the parameters transmitted from the MFP 10.

In S1404, the control transmits the image input command to the MFP 10. In S1405, the control receives the image data transmitted from the MFP 10. In S1406, the control recognizes the text included in the image by applying the OCR process to the image data received in S1405, and translates the text thus recognized into a target language.

In S1407, the control sets a print layout for the text translated in S1406, thereby generating the output data (i.e., print data representing the translated text).

In S1408, the control stores the output data generated in S1407 in the service output information storage unit 27 of the storage unit 23. In S1409, the control judges whether the output data request is received from the MFP 10.

If the control determines that the output data request is not received from the MFP 10 (S1409: NO), the control proceeds to S1410, and judges whether the transmission standby request is received.

If the control determines that the transmission standby request is not received (S1410: NO), the control returns to S1409. If the transmission standby request has been received (S1410: YES), the control finishes the translation copy service.

If the control determines that the output data request is received (S1409: YES), the control proceeds to S1411, and starts transmitting the output data generated in S1407 to the MFP 10.

In S1412, the control judges whether the output start notification is received from the MFP 10. If the control determines that the output start notification is not received (S1412: NO), the control proceeds to S1413, and judges whether a predetermined period has passed since the transmission of the output data was started in S1411.

If the control determines that the predetermined period has not passed (S1413: NO), the control returns to S1412. If the control determines that the predetermined period has passed (S1413: YES), the control finishes the translation copy service.

If the control determines that the output start notification has been received (S1412: YES), the control proceeds to S1414, and executes the charging information updating procedure (FIG. 13) for charging a part of the entire fee (e.g., 25% of the entire fee) of the entire output data.

In S1415, the control sets the output start flag. Specifically, from among the session management information stored in the session management information storage unit 25, the output progress flag stored in association with the user ID of the user who requested the service is changed from "0" to "1".

In S1416, the control determines whether output progress notification (first, second or third output progress notification) notifying of certain amount (25%, 50% or 75%) of output data has been completed is received from the MFP 10. It should be noted that the output progress notification is transmitted in S1220, S1222 and S1224 of the service usage procedure (FIG. 18).

If the control determines that the output progress notification is received (S1416: YES), the control proceeds to S1417, and executes the charge information updating procedure (FIG. 13) for charging a part of (e.g., 25%) of the entire fee for outputting the entire output data.

In S1418, one of output progress flags corresponding to the output progress notification is set. That is, the first, second and third output progression flags are set for the first, second and third output progress notifications, respectively. Specifically, the control updates the output progress flags stored in association with the user ID of the user who made the request from among the session management information stored in the session management information storage unit 25 from "0" to "1". Thereafter, control proceeds to S1416.

If the control determines that the output progress notification has not been received (S1416: NO), the control proceeds to S1419. Then, in S1412, the control judges whether the predetermined period has elapsed.

If the control determines that the predetermined period has elapsed (S1419: YES), the control finishes the translation copy service. That is, if the output start notification is received but the output progress notification is not received for the predetermined period, the control stops transmitting the output data.

If, in S1410, control determines that the predetermined period has not elapsed (S1419: NO), the control proceeds to S1420. In S1420, the control judges whether the charging procedure for entire output data has been finished (i.e., whether the third output progress flag is set).

If the control determines that the charging procedure for the entire output data has not been executed (S1420: NO), the control returns to S1416. If the charging operation for the entire output data has been finished (S1420: YES), the control proceeds to S1421, judges whether the transmission of the output data has completed. If the control determines that the transmission of the output data has been completed (S1421: YES), the control finishes the translation copy service.

Figure 21:
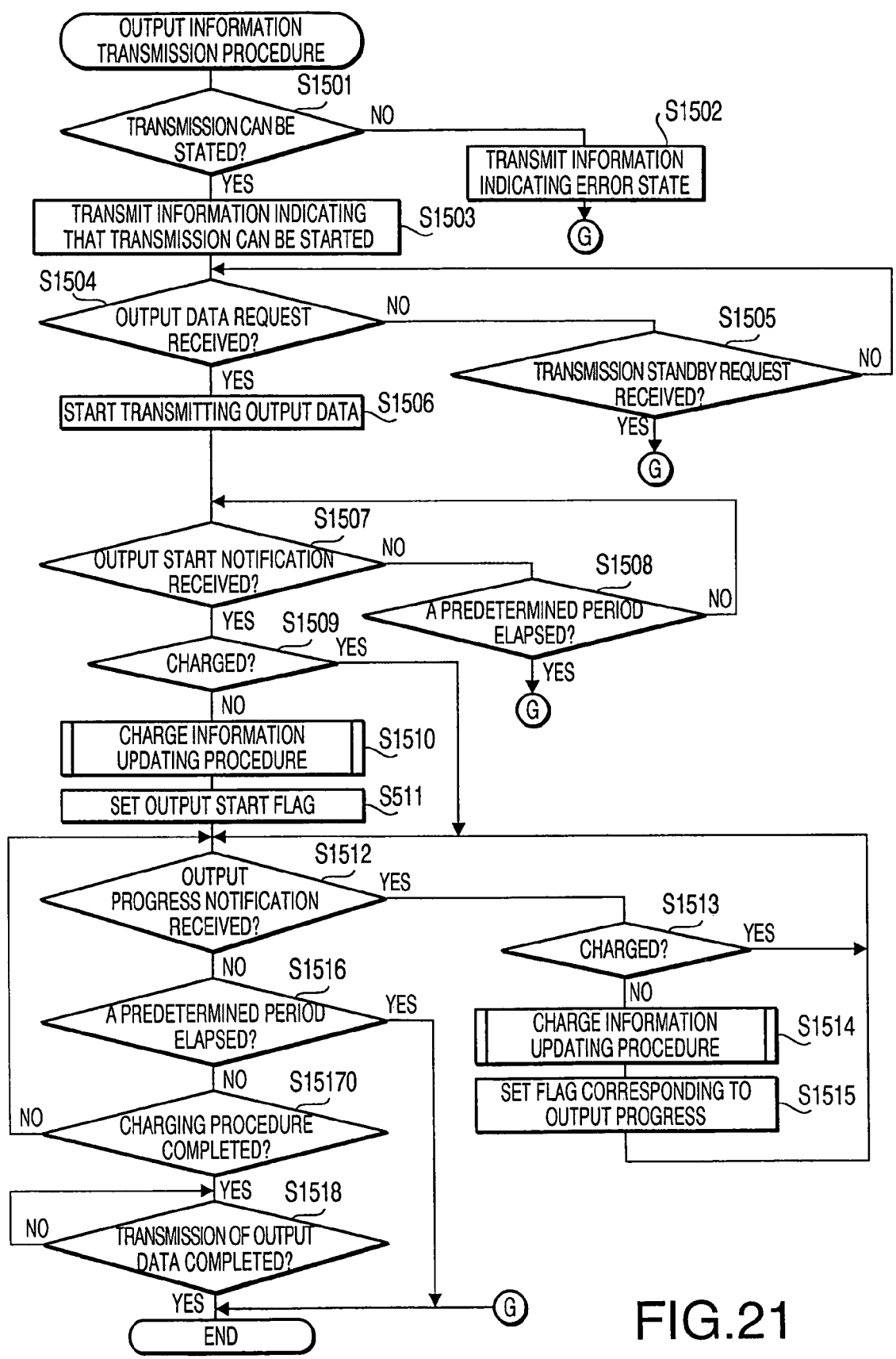
FIG. 21 is a flowchart illustrating an output information transmission procedure according to aspects of the third embodiment.

Next, the output information transmitting procedure according to the third embodiment will be described. The output information transmitting procedure according to the third embodiment shown in FIG. 21 is substantially similar to that of the first embodiment shown in FIG. 11. That is, S1501-S1511, S1518 correspond to S501-S510 and S512, respectively. Thus, the output information transmitting procedure shown in FIG. 21 is different from that shown in FIG. 11 in that the S1512-S1517 are added. In this regard, the steps similar to those in FIG. 11 are described briefly for brevity.

When the output information transmitting procedure is started, the control judges whether the output data can be transmitted in S1501. If the control determines that the output data cannot be transmitted (S1501: NO), the control proceeds to S1502 and transmits error information indicating an error status to the MFP 10. Then, the control finishes the output information transmitting procedure.

If the control determines that the output data can be transmitted (S1501: YES), the control proceeds to S1503, and transmits the information indicating that the output data can be transmitted to the MFP 10. Then, in S1504, the control judges whether the output data request is received from the MFP 10.

If the control determines that the output data request has not been received (S1504: NO), the control judges whether the transmission standby request is received in S1505. If the control determines that the transmission standby request has not been received (S1505: NO), the control returns to S1504.

If the control determines that the transmission standby request is received (S1505: YES), the control finishes the output information transmitting procedure.

If the control determines that the output data request has been received (S1504: YES), control proceeds to S1506, and starts transmitting the output data stored in the service output information storage unit 27 to the MFP 10.

Next, in S1507, the control judges whether the output start notification is received from the MFP 10. If the control determines that the output start notification has not been received (S1507: NO), the control proceeds to S1508, and judges whether a predetermined period has passed after the transmission of the output data was started in S1506.

If the control determines that the predetermined period has not passed (S1508: NO), the control returns to S1507. If the control determines that the predetermined period has passed (S1508: YES), the control finishes the output information transmitting procedure.

If the control determines that the output start notification is received (S1507: YES), the control proceeds to S1509 and judges whether, for this output data, the charging information updating procedure (FIG. 13) has been executed in response to reception of the output start notification. Specifically, referring to the session management information stored in the session management information storage 25, the control determines that the charging information updating procedure has been executed of the output start flag stored, for the session ID received together with the output start notification, is "1", while the control determines that the charging information updating procedure has not been executed if the output start flag is "0".

If the control determines that the charging information updating procedure has not been executed (S1509: NO), the control proceeds to S1510, and the charging information updating procedure for charging a part of the entire fee (e.g., 25%) is executed.

Next, in S1511, the control sets the output start flag. Specifically, from among the session management information stored in the session management information storage unit 25, the control sets the output start flag, which is stored in association with the user ID of the user who made the service request, from "0" to "1".

If the control determines that the charging information updating procedure has been executed (S1509: YES), the control proceeds to S1512. That is, for the output data for which the charging information updating procedure is executed upon receipt of the output start notification, the charging information updating procedure will not be re-executed.

In S1512, the control determines whether the output progress notifications (first, second and third output progress notifications) indicating that the output of the output date has been completed by 25%, 50% and 75%, respectively, have been received from the MFP 10. It should be noted that the output progress notifications are transmitted in S1314, S1316 and S1318 of the output information transmission requesting procedure (FIG. 19) described above.

If the control determines that the output progress notifications have been received (S1512: YES), the control proceeds to S1513, and judges whether the charging information updating procedure (FIG. 13) for the receipt of the output progress notification has been executed. Specifically, referring to the session management information stored in the session management information storage 25, the control determines that, if the output progress flag (first, second or third flag) is "1" the charging information updating procedure has been executed when the output progress notification has been received, while the output progress flag is "0" (for first, second or third output progress notification), the charging information updating procedure has not been executed.

If the charging information updating procedure has not been executed (S1513: NO), the control proceeds to S1514, and executes the charging information updating procedure for charging the part (e.g., 25%) of the charge for the entire output data.

In S1515, the output progress flag corresponding to the output progress notification is set (i.e., first output progress flag for first output progress notification, second output progress flag for second output progress notification, and third output progress flag for third output progress notification). Specifically, the value of the output progress flag stored in association with the user ID of the user who made the service request, from the session management information stored in the session management information storage 25, from "0" to "1". Then, the control returns to S1512.

If the control determines that the charging information updating procedure has been executed, the control returns to S1512. That is, one the charge information updating procedure is executed upon receipt of the output progress notification, the charging information updating procedure corresponding to the same output progress notification will not be executed.

If the control determines that the output progress notification is not received (S1512: NO), the control proceeds to S1516 and determines whether the predetermined period has passed since the output start notification was received in S1507.

If the control determines that the predetermined period has elapsed (S1516: YES), the control finishes the output information transmitting procedure. That is, if the control received the output start notification and has not received the output progress notification within the predetermined period, the control stops transmitting the output data.

If the control determines that the predetermined period has not elapsed (S1516: NO), the control proceeds to S1517, and judges whether the charging procedure for the entire output data has been completed (specifically, whether the third output progress flag has been set).

If the control determines that the charging procedure for the entire output data has not been completed (S1517: NO), the control returns to S1512.

If the control determines that the charging procedure for the entire output data has been completed (S1517: YES), the control proceeds to S1518, and judges whether transmission of the output data has been completed. When completed, the control finishes the output information transmitting procedure.

As described above, according to the third embodiment, the MFP 10 notifies the function server 20 of the progress of the output (start, 25% completed, 50% completed, 75% completed) (S1218, S1220, S1222 and S1224). The function server 20 executes, upon receipt of the notification (S1412: YES; S1416: YES), the charging procedure for the output data (S1414, S1417). Therefore, according to the printing system, an appropriate charging results corresponding to the progress of the output data can be obtained.

The third embodiment is configured such that the output data stored in the function server 20 can be retransmitted to the MFP 10 upon request by the MFP 10 (see FIGS. 19 and 21). In such a case, if the charging procedure has been executed for the retransmitted data, the charging procedure therefor will not be executed again (S1509, S1513). Therefore, according to the first embodiment, it is ensured that the data, for which the charging procedure is executed, is output, and no disadvantage will be given to the user of the MFP 10.

It should be noted that the above described illustrative embodiments are not intended to limit the scope of the invention. The invention can be modified in various ways.

For example, in the printing system of each of the embodiments, charge is managed for each user of the MFP 10. Instead, the charge may be managed for each MFP 10. With such a modification, the function server 20 can execute the charging procedure if the MFP 10 that requested the service is identified, and input operation of the user ID and the password become unnecessary in such a configuration.

According to the printing systems described above, the output data stored in the service output information storage unit 27 can be transmitted in response to the request from the MFP 10. This configuration is only an example, and is not intended to limit the scope of the invention. For example, when the service is a news providing service, the MFP 10 may be configured to request the function server 20 for the output data periodically (e.g., once a day).

Further, in the printing system according to the above-described illustrative embodiments, the output data stored in the service output information storage unit 27 of the function server 20 can be deleted in response to the input operation through the MFP 10. This configuration may be modified such that the output data may be automatically deleted when a predetermined period has elapsed. For another example, the output data may not be stored in the function server 20.

In the printing system according to the above-described embodiments, the output data can be transmitted to the MFP 10 regardless of the unsettled charge of the charge information stored in the charging information storage unit 24 of the function server 20. The invention need not be limited to such a configuration, and various modifications may be employed. For example, transmission of the output data may be prevented if the unsettled charge amount is greater than a predetermined value.

Further, according to the third embodiment, the charging procedure is executed when output data is started to be output, when output of 25% of the output data is completed, when output of 50% of the output data is completed, and when output of 75% of the output data is completed. The timing when the charging procedure is executed need not be limited to such a configuration. For example, the printing system may be configured that the charging procedure is executed in accordance with the number of sheets (pages) represented by the print data.

In the printing system described above, the configuration using the MFP 10 as the printer is described. It should be noted that the invention need not be limited to such a configuration, and well-known devices having a printing function (e.g., printer, facsimile, copier and the like) can also be used as the printer alternatively or optionally.

What is claimed is:

1. A printing system comprising:
    a printing apparatus configured to print an image represented by print data on a recording medium;
    a data transmitting server configured to transmit the print data to the printing apparatus, the data transmitting server being capable of performing data communication with the printing apparatus,
    wherein the printing apparatus is provided with:
        a printing unit configured to receive the print data transmitted by the data transmitting server and print an image represented by the received print data on the recording medium; and
        a progress notifying unit configured to transmit progress data indicative of progress of a printing operation executed by the printing unit to the data transmission server, and
    wherein the data transmitting server is provided with a charging unit configured to determine the progress of the printing operation based on the progress data received from the printing unit and perform at least one charging operation with respect to the print data transmitted to the printing apparatus at a plurality of different stages prior to completion of the printing operation in accordance with the progress of the printing operation, wherein the printing operation is executed automatically until the completion of the printing operation;
    wherein the progress notifying unit transmits the progress data at completion of the printing operation for each of the plurality of different stages between the start and the completion of the printing operation by the printing unit, and
    wherein the charging unit executes the charging operation upon every reception of the progress data, regarding the printing operation for the subsequent one of the plurality of different stages.

2. The printing system according to claim 1,
    wherein the progress notifying unit transmits the progress data to the data transmission server together with identification information with which the print data corresponding to the progress data can be identified.

3. The printing system according to claim 2,
    wherein the data transmission server includes a charging status storage that stores the identification information in association with a charging status for the corresponding print data, and
    wherein the charging unit is configured such that the charging operation once executed will not be re-executed based on the charging status stored in the charging status storage.

4. A printing apparatus, which is configured to print an image represented by print data on a recording medium, for a printing system provided with the printing apparatus, and a data transmitting server configured to transmit the print data to the printing apparatus, the data transmitting server being capable of performing data communication with the printing apparatus, the data transmitting server being provided with a charging unit configured to determine the progress of the printing operation based on the progress data received from the printing apparatus and perform charging operations with respect to the print data transmitted to the printing apparatus at a plurality of different stages prior to completion of the printing operation in accordance with the progress of the printing operation,
    wherein the printing apparatus is provided with a progress notifying unit configured to transmit progress data indicative of progress of a printing operation executed by the printing apparatus to the data transmission server, wherein the printing operation is executed automatically until the completion of the printing operation;
    wherein the progress notifying unit transmits the progress data at completion of the printing operation for each of the plurality of different stages between the start and the completion of the printing operation by the printing unit, and
    wherein the charging unit executes the charging operation upon every reception of the progress data, regarding the printing operation for the subsequent one of the plurality of different stages.

5. A data transmission server configured to transmit print data to a printing apparatus, the data transmitting server comprising a charging unit configured to determine the progress of the printing operation based on the progress data received from the printing unit and perform charging operations with respect to the print data transmitted to the printing apparatus at a plurality of different stages prior to completion of the printing operation in accordance with the progress of the printing operation, wherein the printing operation is executed automatically until the completion of the printing operation;
    wherein the progress notifying unit transmits the progress data at completion of the printing operation for each of the plurality of different stages between the start and the completion of the printing operation by the printing unit, and
    wherein the charging unit executes the charging operation upon every reception of the progress data, regarding the printing operation for the subsequent one of the plurality of different stages.

* * * * *